(12) United States Patent
Popov et al.

(10) Patent No.: US 12,095,394 B2
(45) Date of Patent: Sep. 17, 2024

(54) INDUCTION MACHINES WITHOUT PERMANENT MAGNETS

(71) Applicant: Linear Labs, Inc., Fort Worth, TX (US)

(72) Inventors: Andrei Popov, Azle, TX (US); Michael Van Steenburg, Fort Worth, TX (US); Fred Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 254 days.

(21) Appl. No.: 17/562,570

(22) Filed: Dec. 27, 2021

(65) Prior Publication Data

US 2022/0123635 A1    Apr. 21, 2022

Related U.S. Application Data

(63) Continuation of application No. PCT/US2020/039961, filed on Jun. 26, 2020.

(60) Provisional application No. 62/867,189, filed on Jun. 26, 2019.

(51) Int. Cl.
| | |
|---|---|
| *H02K 17/16* | (2006.01) |
| *H02K 1/14* | (2006.01) |
| *H02K 1/27* | (2022.01) |
| *H02K 16/02* | (2006.01) |
| *H02K 19/10* | (2006.01) |
| *H02K 21/26* | (2006.01) |
| *H02P 25/08* | (2016.01) |

(52) U.S. Cl.
CPC .............. *H02P 25/08* (2013.01); *H02K 1/145* (2013.01); *H02K 1/27* (2013.01); *H02K 16/02* (2013.01); *H02K 17/165* (2013.01); *H02K 19/103* (2013.01); *H02K 21/26* (2013.01); *H02K 2201/12* (2013.01)

(58) Field of Classification Search
CPC .......... H02P 25/08; H02K 1/145; H02K 1/27; H02K 16/02; H02K 17/165; H02K 19/103; H02K 21/26; H02K 2201/12; H02K 1/246; H02K 19/24
See application file for complete search history.

(56) References Cited

U.S. PATENT DOCUMENTS

| | | | |
|---|---|---|---|
| 2013/0154430 A1* | 6/2013 | Dragon | H02K 15/0012 310/211 |
| 2016/0380496 A1* | 12/2016 | Hunstable | H02K 21/26 310/179 |

* cited by examiner

*Primary Examiner* — Thomas Truong
(74) *Attorney, Agent, or Firm* — Run8 Patent Group, LLC; Peter Miller; Alexander Rodriguez

(57) ABSTRACT

Disclosed are various embodiments for an induction machine having a rotor comprising a plurality of rotor core assemblies configured to form a toroidal magnetic torque tunnel having at least a first inductive tunnel segment and a second inductive tunnel segment and a stator having a plurality of coils configured to form a coil winding assembly, the coil winding assembly positioned within the toroidal magnetic torque tunnel, such that at least one of the plurality of coils is surrounded by the first inductive tunnel segment or the second inductive tunnel segment, alternatively the rotor may be the coil winding assembly and the stator may be the toroidal magnetic torque tunnel.

20 Claims, 24 Drawing Sheets

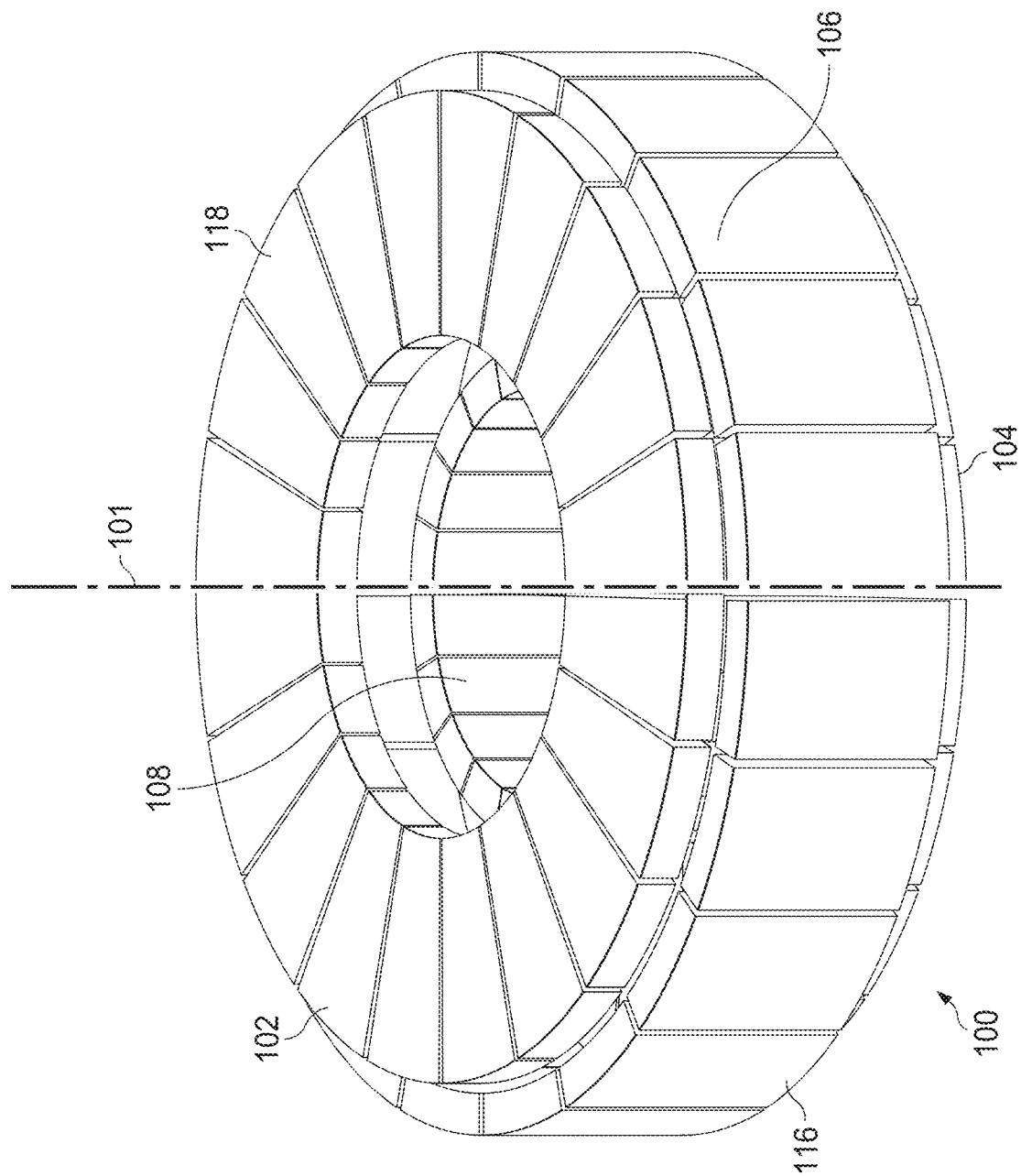
Fig. 1B1

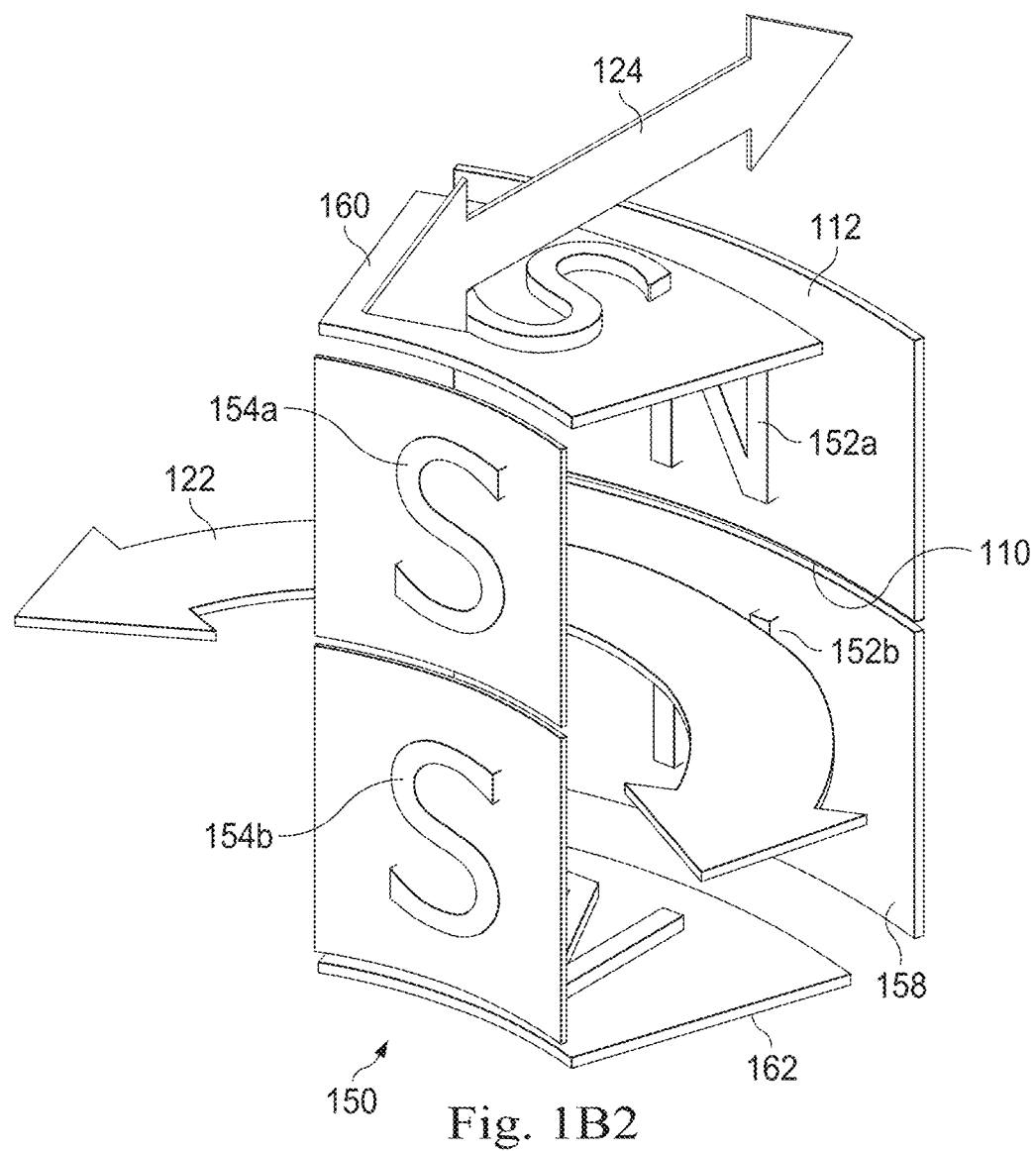
Fig. 1B2

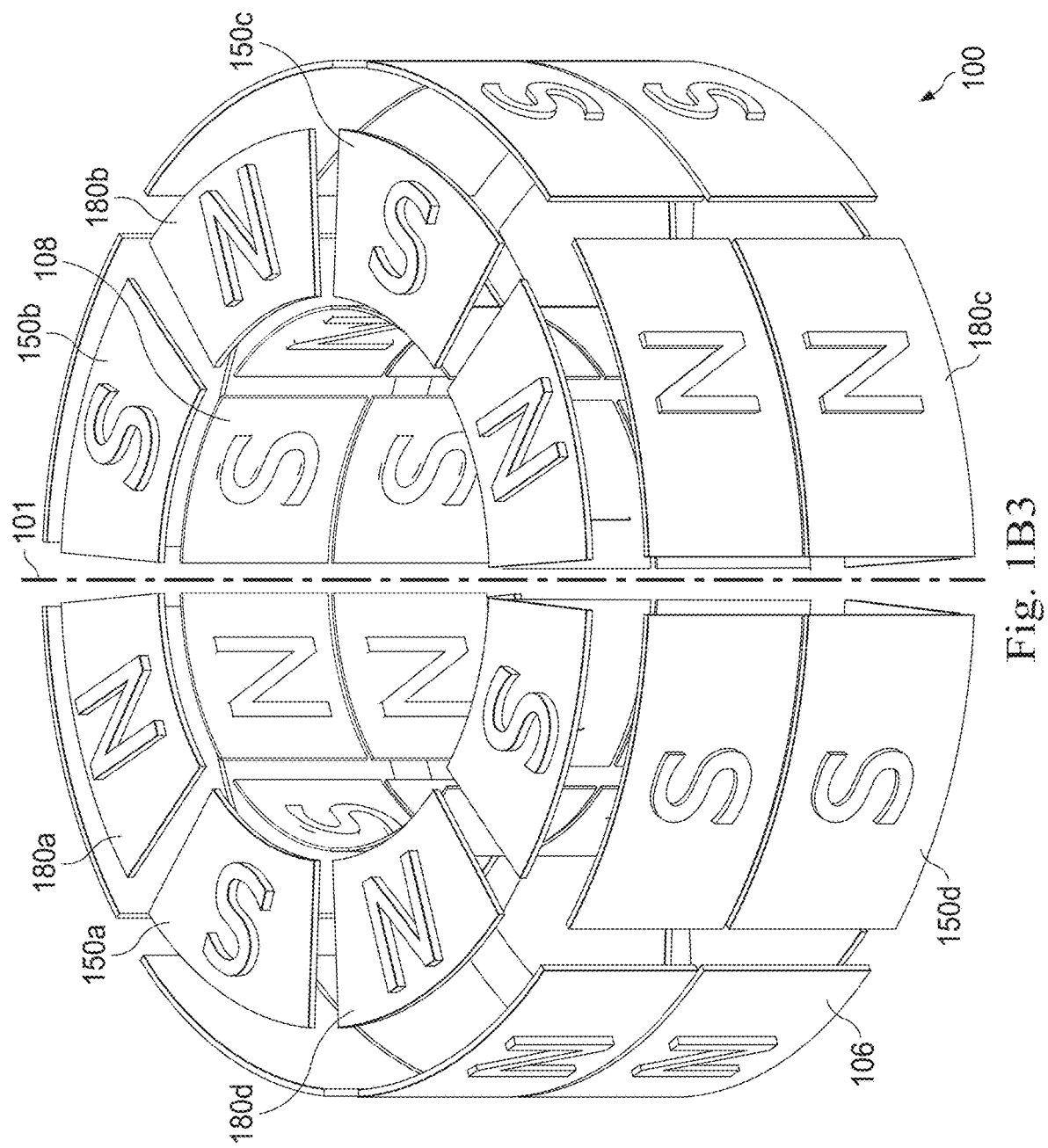
Fig. 1B3

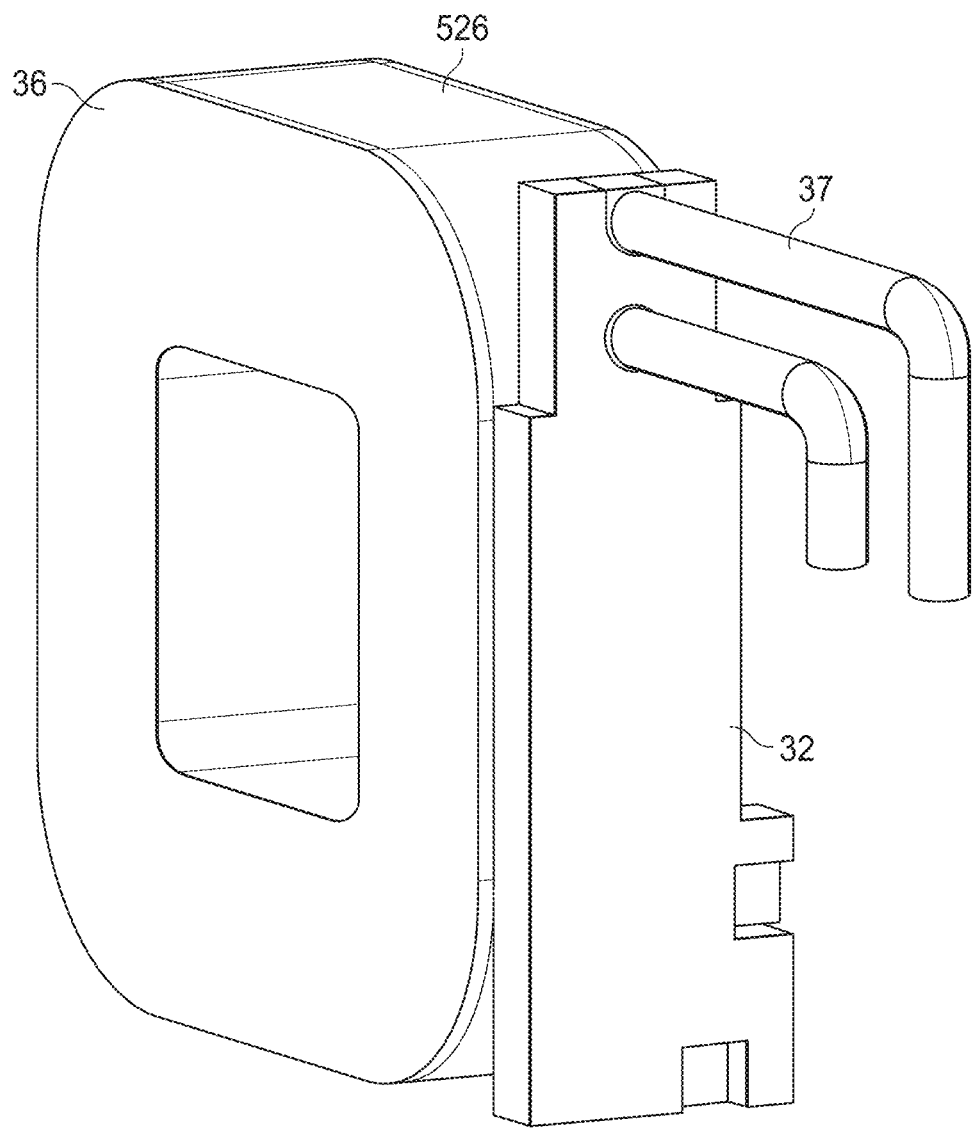
Fig. 1C1

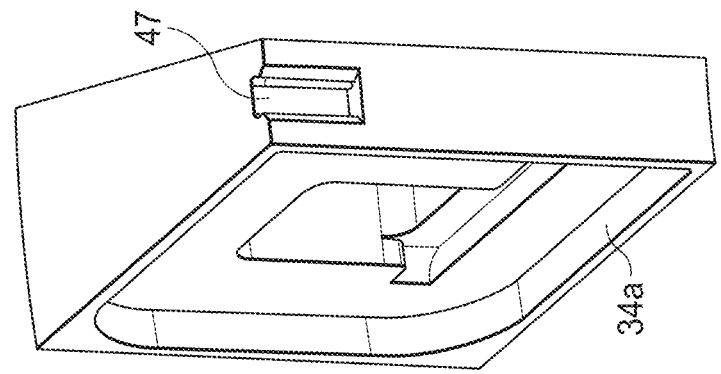
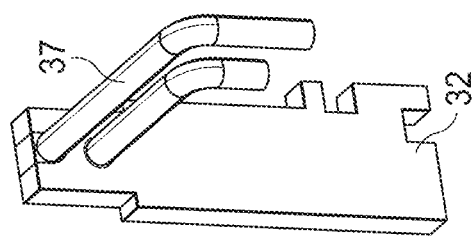
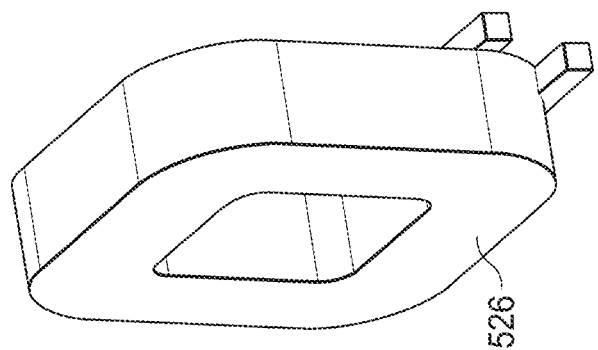
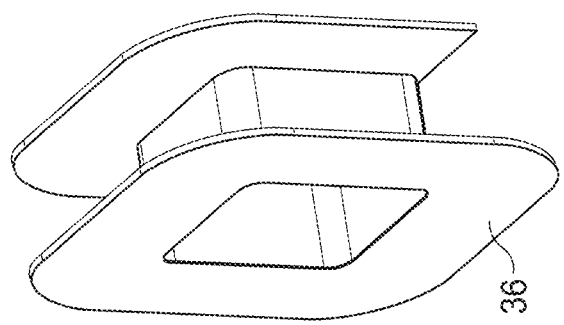
Fig. 1C2

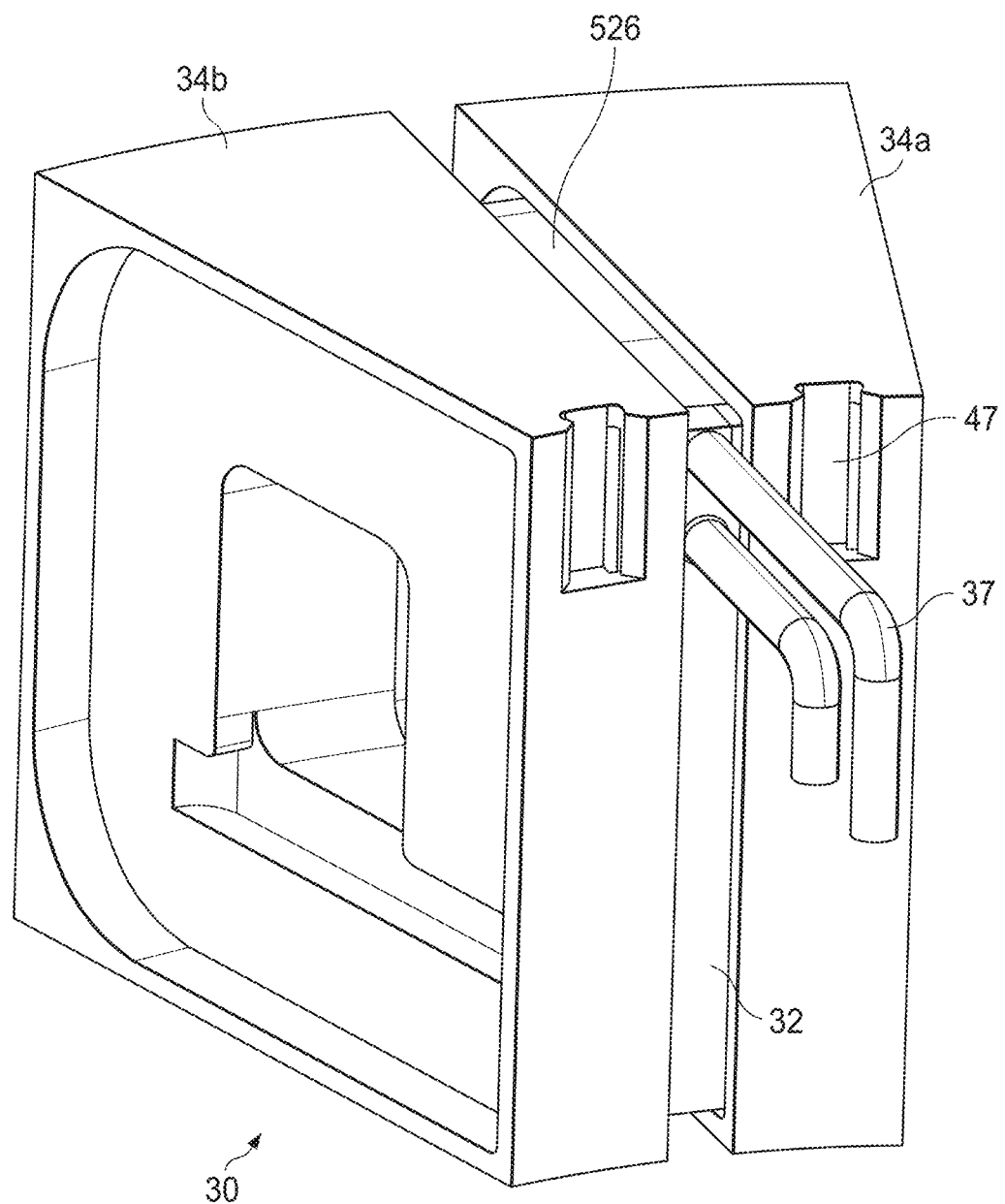
Fig. 1C3

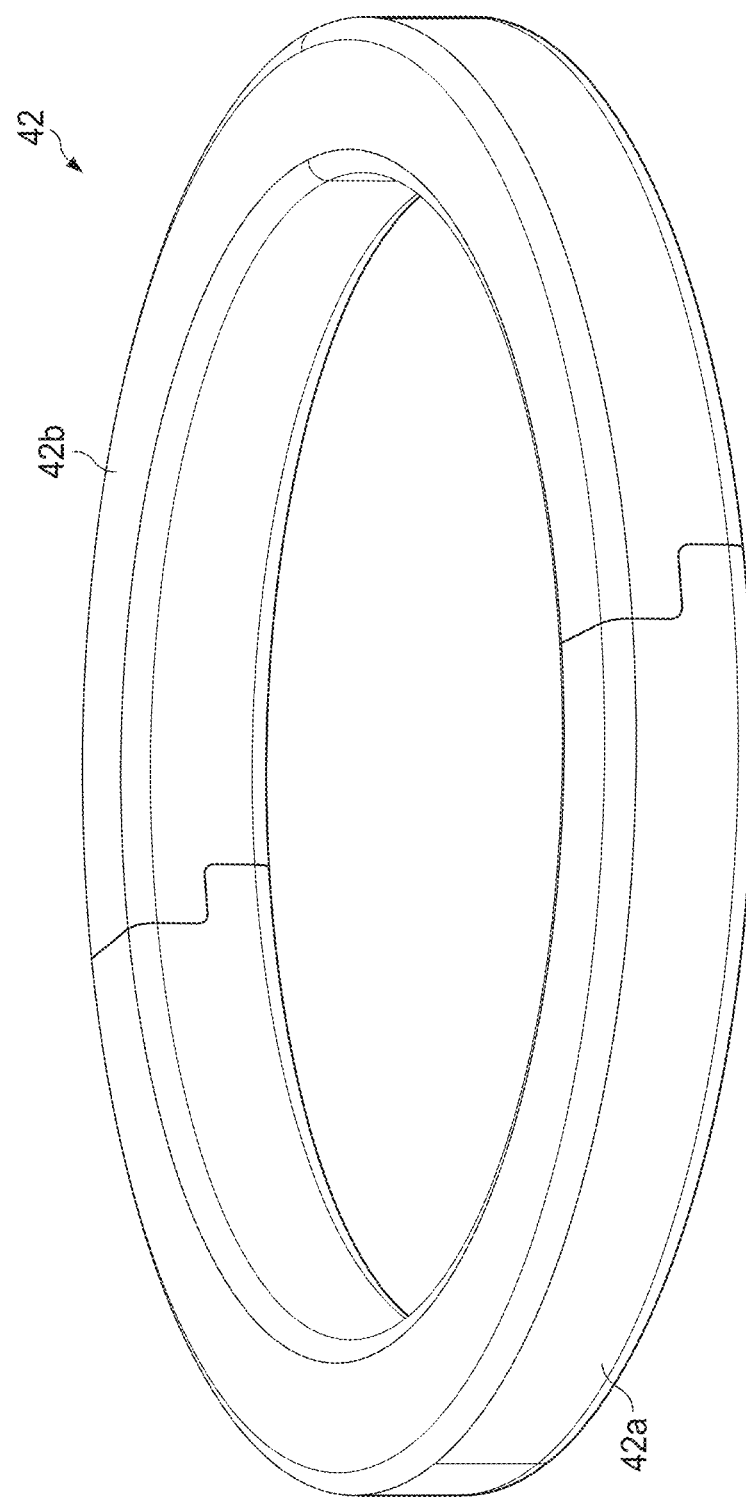
Fig. 1D1

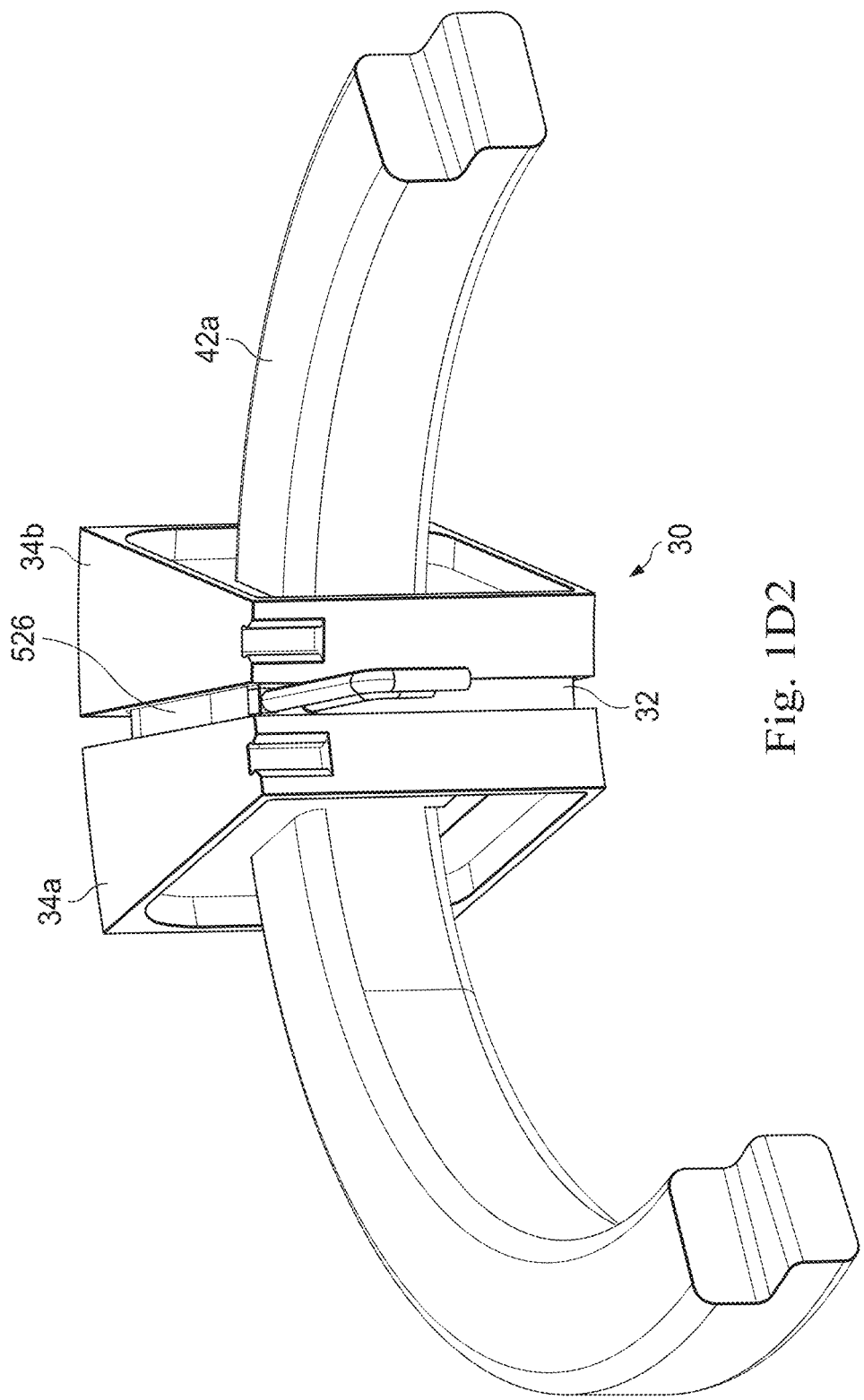
Fig. 1D2

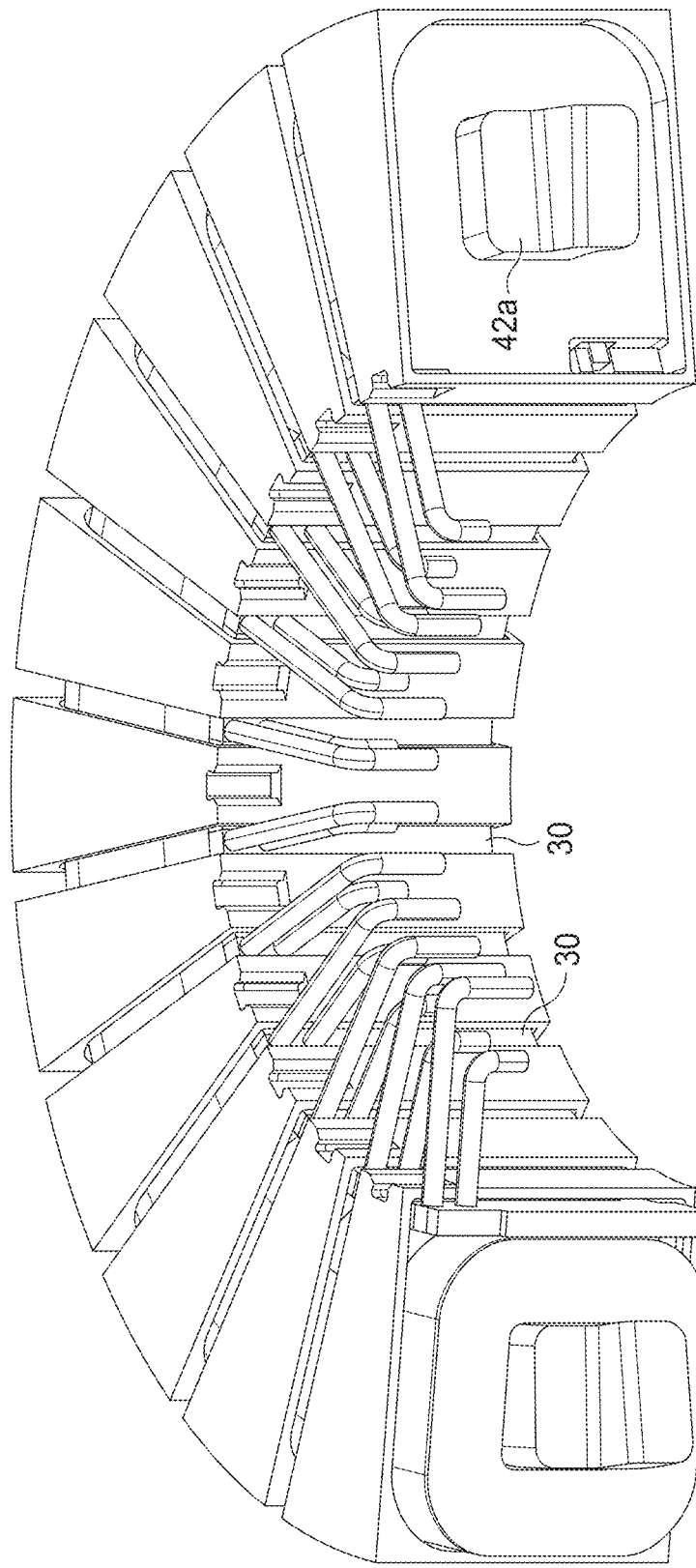
Fig. 1D3

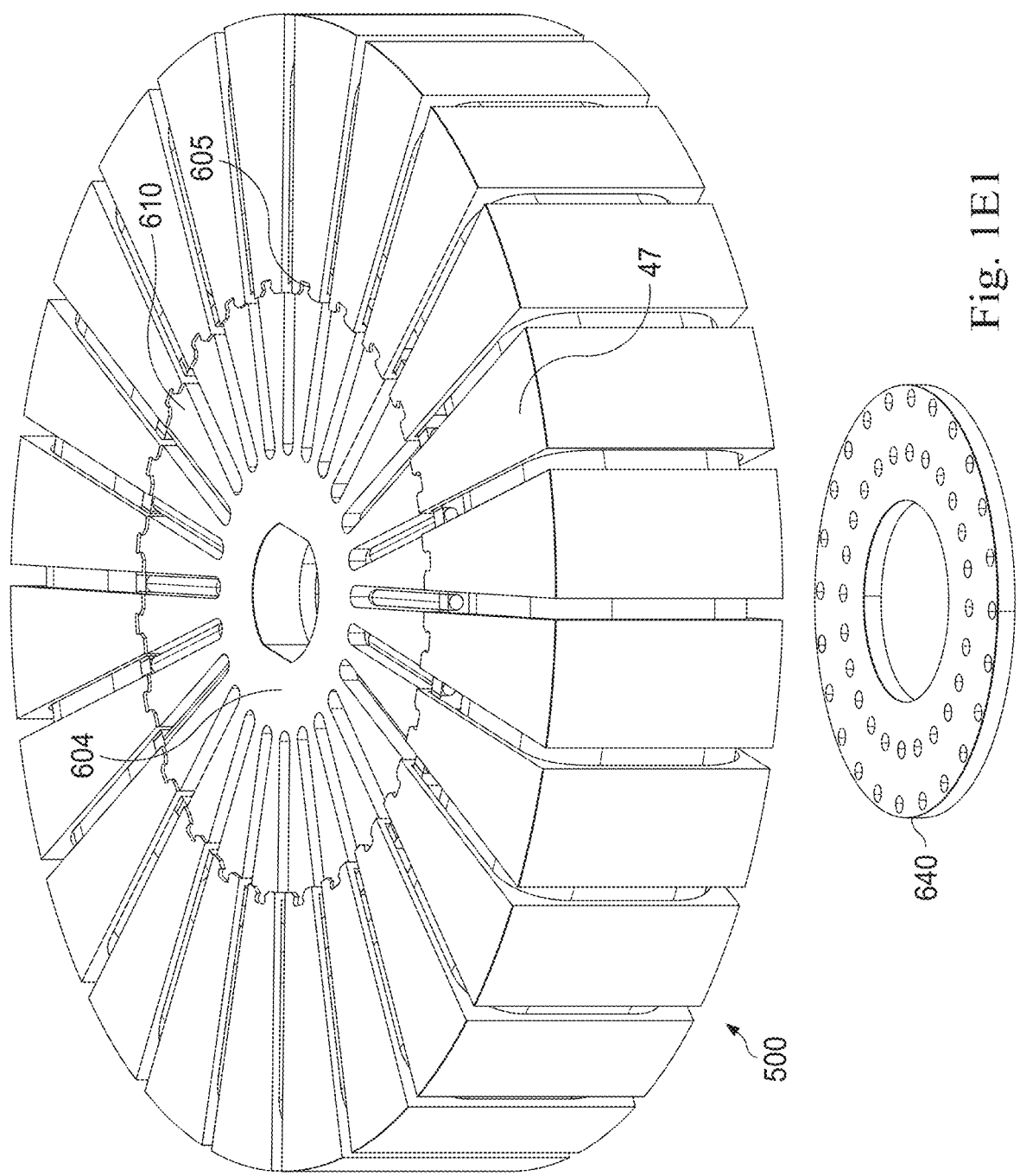
Fig. 1E1

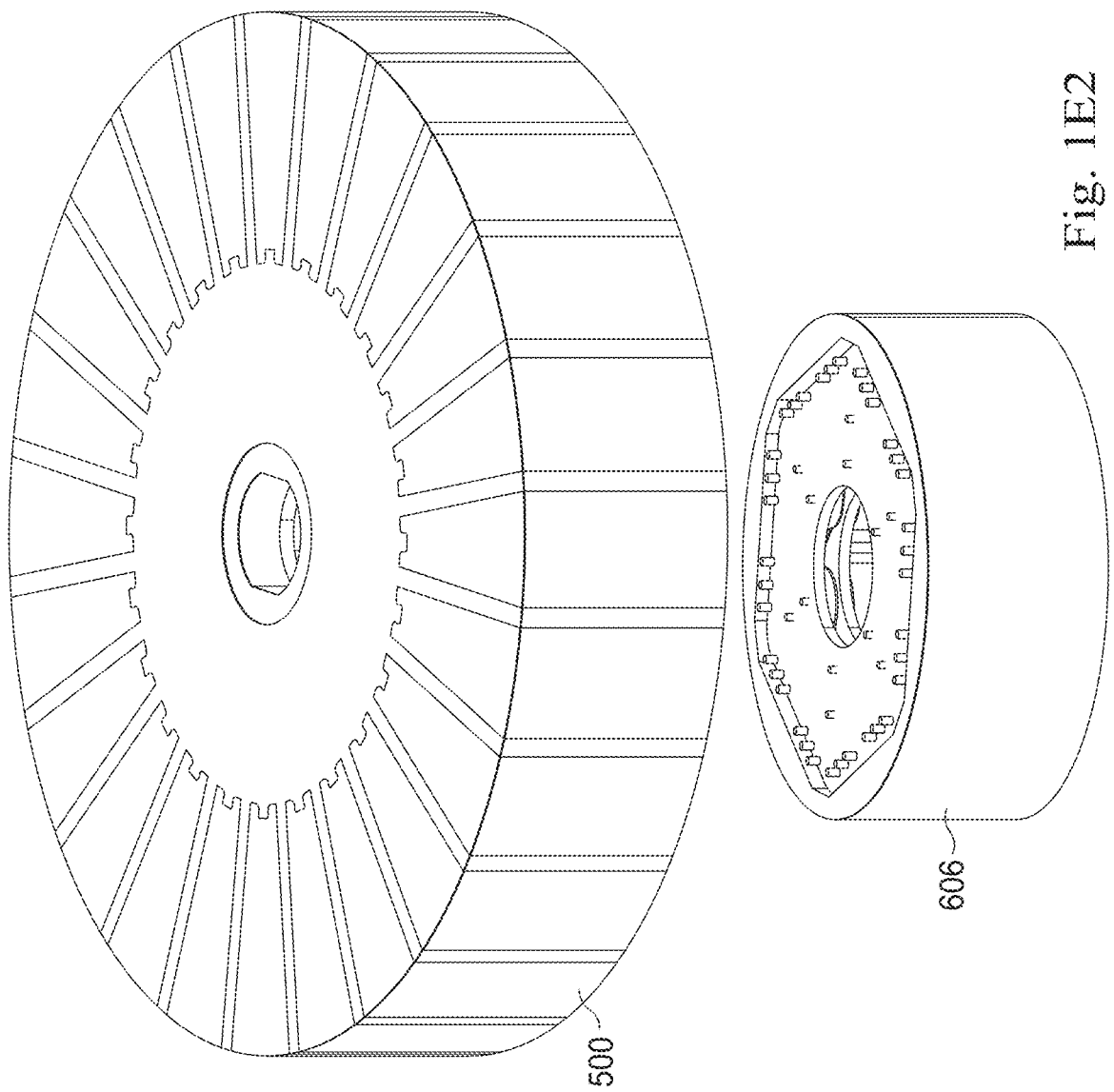
Fig. 1E2

INDUCTION MACHINES WITHOUT PERMANENT MAGNETS

RELATED APPLICATIONS

This application is a continuation of PCT Application No. PCT/US2020/039961 entitled "INDUCTION MACHINES WITHOUT PERMANENT MAGNETS," filed on Jun. 26, 2020, which claims priority to U.S. application No. 62/867,189 entitled "ELECTRIC MOTORS WITHOUT PERMANENT MAGNETS," filed on Jun. 26, 2019. The disclosures of both are hereby incorporated by reference for all purposes.

This application is also commonly owned with the following U.S. patent applications: U.S. application No. 62/185,637 entitled "An Improved Electric Motor/Generator," filed on Jun. 28, 2015, U.S. application Ser. No. 15/008,431 entitled "An Improved Multi-Tunnel Electric Motor Generator," filed on Jan. 27, 2016, PCT Application number PCT/US15/26776, entitled "AN IMPROVED MULTI-TUNNEL ELECTRIC MOTOR/GENERATOR" filed on Apr. 8, 2016, U.S. patent application Ser. No. 14/866,788, entitled "An Improved Brushless Electric Motor/Generator," filed on Sep. 25, 2015; U.S. patent application Ser. No. 14/866,787, entitled "An Improved Brushed Electric Motor/Generator," filed on Sep. 25, 2015; U.S. application Ser. No. 14/608,232, entitled "An Improved Brushless Electric Motor/Generator," filed on Jan. 29, 2015; and U.S. application Ser. No. 13/848,048, entitled "An Improved DC Electric Motor/Generator with Enhanced Permanent Magnetic Flux Densities" filed on Mar. 20, 2013, the disclosures of which are hereby incorporated by reference for all purposes.

TECHNICAL FIELD

The invention relates in general to new and improved electric motors and /generators, or electric machines for producing rotary motion or generating electrical power from rotary motion input and in particular, to electric machines which do not use permanent magnets.

BACKGROUND INFORMATION

Electric motors use electrical energy to produce mechanical energy, typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. In a conventional electric motor, a central core (commonly known as the rotor) of tightly wrapped current carrying material creates magnetic poles which rotate at high speed between the fixed poles of a magnet (commonly known as the stator) when an electric current is applied. The central core is normally coupled to a shaft which rotates with the rotor. The shaft may be used to drive gears and wheels in a rotary machine or convert rotational motion into motion in a straight line. With conventional motors a pulsed electrical current of sufficient magnitude must be applied to produce a given torque or horsepower output.

Generators are usually based on the principle of electromagnetic induction, which was discovered by Michael Faraday in 1831. Faraday discovered that when an electrical conducting material, such as coils of copper wire, are moved through a magnetic field, or vice versa, an electric current will begin to flow through that moving conducting material. In this situation, the coils of wire are called the armature, because they are moving with respect to the stationary magnets, which are called the stator. Typically, the moving component is called the rotor or armature and the stationary components are called the stator. The power generated is a function of flux strength, conductor size, number of pole pieces, and motor speed in revolutions per minute (RPM).

In motors or generators, some form of energy drives the rotation of the rotor. As energy becomes scarcer and more expensive, what is needed are more efficient motors and generators to reduce energy consumption and hence reduce costs. Further, China currently dominates the supply of rare earth metals and in the past has threatened to stop exporting rare earth material as part of on-going trade negotiations with the U.S.

SUMMARY

In response to this and other problems, this patent application is an expansion of previous patents and patent applications that discussed using methods and systems of increasing flux density in asynchronous and synchronous motor/generators by using multiple magnetic torque tunnels, further modified so that they can function without the use of permanent magnets. Such motors include embodiments for switched reluctance motors (SRM), induction motors (IM), reluctance synchronous motors (RSM), and the like.

These and other features, and advantages, will be more clearly understood from the following detailed description taken in conjunction with the accompanying drawings.

BRIEF DESCRIPTION OF THE DRAWINGS

FIG. 1B1 is a detailed isometric view of one embodiment of an assembled magnetic toroidal cylinder or magnetic disk of FIG. 1A.

FIG. 1B2 is a detailed isometric view illustrating one embodiment of a magnetic tunnel segment of the magnetic toroidal cylinder.

FIG. 1B3 is a detailed view illustrating one embodiment of a magnetic toroidal cylinder showing the magnetic pole orientation of the individual magnetic tunnel segments.

FIG. 1C1 is a detailed isometric view of a power or coil module.

FIG. 1C2 is a detailed exploded isometric view of the primary components comprising the coil module of FIG. 1C1.

FIG. 1C3 is an isometric view of a coil module sandwiched between two pole portions.

FIG. 1D1 is an isometric view of a central core or yoke for a coil winding assembly.

FIG. 1D2 is an isometric view of a coil module positioned about a portion of the central core.

FIG. 1D3 is an isometric view of the central core portion of FIG. 1D2 illustrating additional coil modules positioned about the central core.

FIG. 1E1 is an isometric view of a coil winding assembly formed by joining the core portion illustrated in FIG. 1D3 with another core portion also having a full complement of coil modules and a spider.

FIG. 1E2 is an isometric exploded view of the assembled coil module after potting a brushless motor controller.

FIG. 2H is an isometric view of the outer rotor cage and

DETAILED DESCRIPTION

Figure 1A:
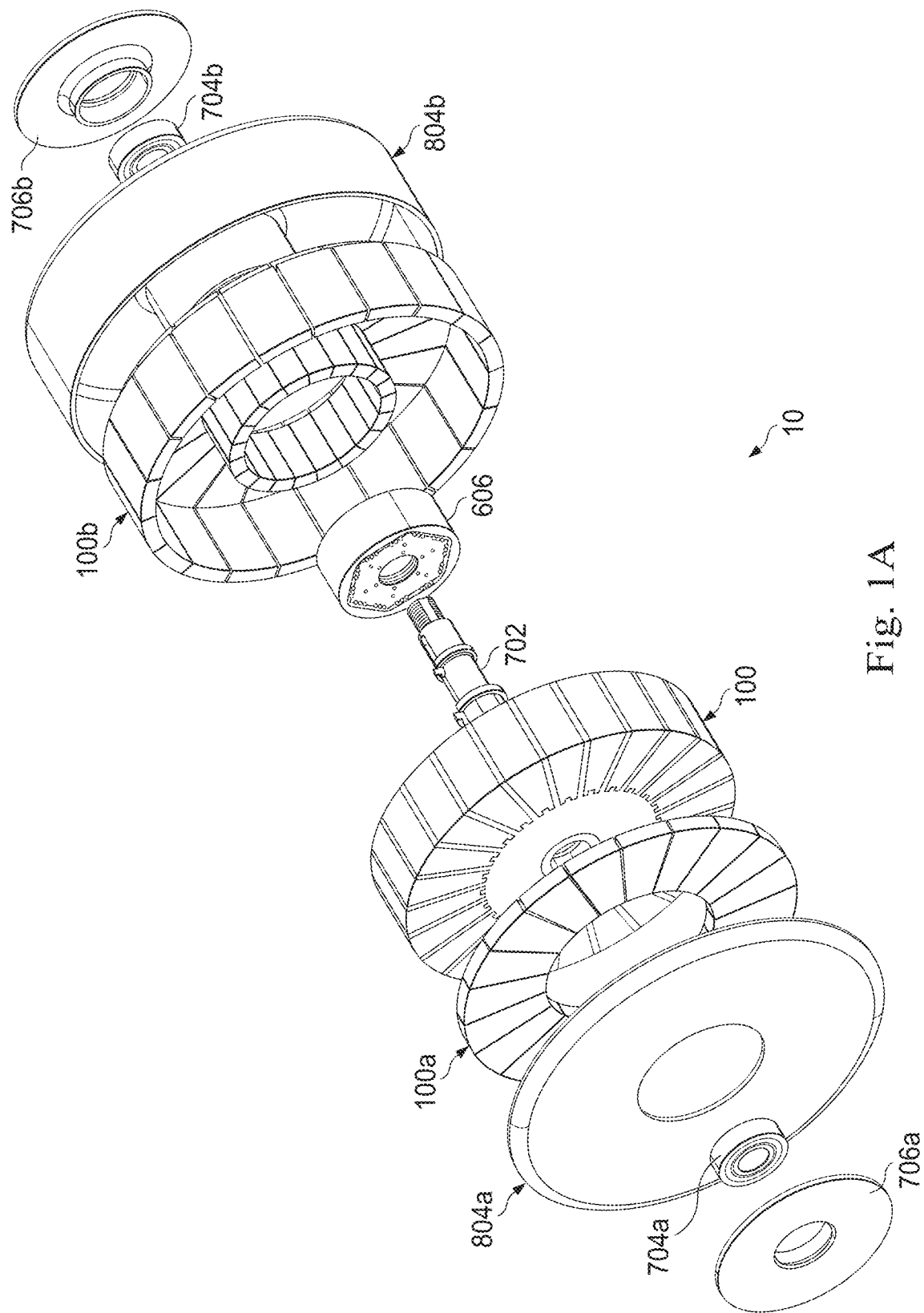
FIG. 1A is an exploded view of one embodiment of an electrical motor/generator component according to certain aspects of the present disclosure.

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

When directions, such as upper, lower, top, bottom, clockwise, counterclockwise, are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Clarification of Terms

The flow of current through a conductor creates a magnetic field. When a current carrying conductor is placed in a magnetic field the current carrying conductor will experience a force. The force that the current carrying conductor experiences is proportional to the current in the wire and the strength of the magnet field that it is placed in. Further, the force that the current carrying conductor experiences will be greatest when the magnetic field is perpendicular to the conductor. For the purposes of this application "flux current" is defined as the rate of current flow through a given conductor cross-sectional area. In some embodiments described herein the source of the magnetic field may be a current flowing in individual coils of a motor winding. In other embodiments, the source of the magnetic field may be a permanent magnet. The magnetic field associated with the permanent magnetic may be visualized as comprising of a plurality of directional magnetic flux lines surrounding the permanent magnet. The magnetic flux lines, often denoted as $\Phi$, or $\Phi_B$, are conventionally taken as positively directed from a N pole to a S pole of the permanent magnet. The flux density, often written in bold type as B, in a sectional area A of the magnetic field surrounding the permanent magnet is defined as the magnetic flux $\Phi$ divided by the area A and is a vector quantity.

For the purposes of this application permeability is a measure of the ability of a material to support the formation of magnetic field within the material. That is, permeability is the degree of magnetization that the material will obtain in response to an applied magnetic field.

For the purposes of this application an "inductor" is defined as an electrical component that stores energy in a magnetic field when electric current flows through the inductor. Inductors normally consist of an insulated conducting wire wound into a coil around a core of ferromagnetic material like iron. The magnetizing field from the coil will induce magnetization in the ferromagnetic material thereby increasing the magnetic flux. The high permeability of the ferromagnetic core significantly increases the inductance of the coil. In some embodiments described herein the permeability of the ferromagnetic core may increase the inductance of the coil by a factor of about one thousand or more. The inductance of a circuit depends on the geometry of the current path and the magnetic permeability of nearby materials. For instance, winding a copper wire into a coil increases the number of times the magnetic flux lines link the circuit thereby increasing the field and thus the inductance of the circuit. That is, the more coils the higher the inductance. The inductance also depends on other factors, such as, the shape of the coil, the separation of the coils, and the like. Flux linkage occurs when the magnetic flux lines pass through the coil of wire and its magnitude is determined by the number of coils and the flux density.

For the purposes of this application the axis of the rotor pole may be referred to as the direct-axis or d-axis, whereas the axis in quadrature to the rotor pole may be referred to as the quadrature axis or q-axis. The direct axis is the axis in which flux is produced by the field winding. The quadrature axis is the axis on which torque is produced by the field winding. The effect of the armature (stator) flux on the flux produced by the rotor filed is called the armature reaction flux. The armature reaction flux $\Phi_{AR}$ has two components, $\Phi_d$ along the direct axis and $\Phi_q$ along the quadrature axis. In AC motors the salient pole field winding rotates, as does the d-axis and q-axis spatially. By convention, the quadrature axis always leads the direct axis electrically by 90 degrees. The d-axis and q-axis inductances are the inductances measured as the flux path passes through the rotor in relation to the magnetic pole. The d-axis inductance is the inductance measured when flux passes through the magnetic poles. The q-axis inductance is the inductance measure when flux passes between the magnetic poles.

For the purposes of this application the term "excitation current" is the current in the stator winding required to generate magnetic flux in the rotor. Permanent magnet machines do not require an excitation current in the stator winding because the motor's magnets already generate a standing magnetic field. The torque-producing current is the current required to generate motor torque. In a permanent magnet machine, the torque-producing current makes up most of the current draw.

When the current flowing through the inductor changes, the time-varying magnetic field induces an Electromotive Force (emf) (voltage) in the conductor, described by Faraday's law of induction. According to Lenz's law, the induced voltage has a polarity which opposes the change in current that created it. As a result, inductors oppose any changes in current through them. For the purposes of this application the term "back electromotive force" or "back emf" is the voltage that occurs in electric motors when there is a relative motion between the stator windings and the rotor's magnetic field. The geometric properties of the rotor will determine the shape of the back emf waveform. The back emf waveforms may be sinusoidal, trapezoidal, triangular, or a combination thereof. Both induction and Permanent Magnet (PM) motors generate back emf waveforms. In an induction machine, the back-emf waveform will decay as the residual rotor field slowly decays because of the lack of a stator field. However, in PM machine the rotor generates its own magnetic field. Therefore, a voltage can be induced in the stator windings whenever the rotor is in motion. The back emf voltage will rise linearly with speed and is a substantial factor in determining maximum operating speed of an electric motor.

In some embodiments, the PM motor may be a surface permanent magnet motor (SPM). That is, the permanent magnets are affixed to an exterior surface of the rotor. In other embodiments, the PM motor may be an interior permanent magnet motor (IPM). That is, the permanent magnets are inside or encapsulated by the rotor.

An electric motor's torque comprises of magnetic torque and reluctance torque, Magnetic torque is the torque generated by the interaction between the magnet's flux field and the current in the stator winding. Reluctance torque is the force acting on a ferromagnetic material placed in an external magnetic field that causes the ferromagnetic material to align with the external magnetic field, such that, the reluctance is minimized. That is, reluctance torque is the torque generated by the alignment of the rotor shaft to the stator flux field.

For the purposes of this application the term "magnetic saliency" describes the relationship between the rotor's main flux (d-axis) inductance and the main torque-producing (q-axis) inductance. The magnetic saliency may vary depending on the position of the rotor to the stator field, with maximum saliency occurring at 90 electrical degrees from the main flux axis. A Surface Permanent Magnet (SPM) motor has a near unity saliency ratio. That is, the d-axis inductance is approximately equal to the q-axis inductance regardless of the rotor position, because of this SPM motor designs rely significantly, if not completely, on the magnetic torque component to produce torque. In contrast to the SPM motor, the magnetic saliency of the Internal Permanent Magnet (IPM) motor is quite high, with the q-axis inductance being relatively high compared to that of the d-axis inductance. For this reason, an IPM motor can generate torque using both the magnetic torque and the reluctance torque components. In some embodiments, the mechanical strength of the IPM motor may be higher than the SPM Motor because the magnets are embedded in the rotor. In certain, embodiments, the IPM motor may be used in applications requiring a higher rpm.

For purposes of this application the term "back iron" may refer to iron or any ferrous-magnetic compound or alloy, such as stainless steel, any nickel or cobalt alloy, electrical steel, laminated steel, laminated silicon steel, or any laminated metal comprising laminated sheets of such material, or a sintered specialty magnetic powder.

System Overview of the GEN II Embodiment

FIG. 1A is an exploded isometric view of an electric machine 10 comprising a magnetic toroidal cylinder 100 including a first portion 100a and a second portion 100b, a coil winding assembly 500 (not shown), a back-iron circuit 804 including a first portion 804a and a second portion 804b, a center shaft or axle 702 and structural components, such as bearings 704a and 704b and bearing flanges 706a and 706b, respectively. Embodiments, of the electric machine 10 are also known as the Hunstable Electric Turbine (HET) or a circumferential flux four rotor electric machine.

The back-iron circuit 804 while theoretically optional serves to strengthen magnetic elements as described below and constrain the magnetic circuit to limit reluctance by removing or reducing the return air path.

In other embodiments, the back-iron circuit 804 may be electric steel (magnet steel) that also provides structural integrity due to its high rigidity/stiffness. In other embodiments, the back-iron circuit 804 may be made from tape wound magnetic steel laminations using high-speed tape winding techniques. The tape may have an insulated coating which then separates each magnetic steel lamination so that the magnetic flux cannot migrate from one lamination to the next. In other embodiments, the tape may be coated with an insulating layer of an electrically insulating polyimide sheet, an aromatic nylon sheet, a synthetic fiber sheet, or other non-surface core plating electrically insulating sheet to further reduce the flux and current flow. This forces the magnetic flux to stay in within each magnetic steel lamination and to flow only in the plane of the magnetic steel tape. In embodiments using a Halbach array such heavy materials are not needed (although a stiff structure may be required for structural integrity—such as Polyether Ether Ketone (PEEK), aluminum or carbon fiber).

In the embodiment of FIG. 1A, the coil winding assembly 500 is the stator and the magnetic toroidal cylinder 100 is the rotor and structural members, such as bearing flanges 706a and 706b and bearings 704a and 704b position the electric machine 10 about the center shaft 702. In other configurations, the coil winding assembly 500 may be a rotor and the magnetic toroidal cylinder 100 the stator. Further, the illustrated embodiment is only one way of configuring and supporting the motor modules and/or the coil winding assembly 500. In other embodiments the coil winding assembly 500 may be supported by support ring extending through a center slot between the outer cylindrical walls from the coil winding assembly 500 to an exterior casing or housing. In yet other embodiments when the coil winding assembly 500 is functioning as a rotor, the coil winding assembly 500 may be supported by a support ring extending through a center slot between the inner cylindrical walls from the coil winding assembly 500 to the shaft. The exact configuration depends on design choices as to whether the coil winding assembly 500 is to be the stator or the rotor.

Magnetic Toroidal Cylinder

FIG. 1B1 is a detailed isometric view of one embodiment of the assembled magnetic toroidal cylinder 100 or magnetic disk of FIG. 1A. In the embodiment illustrated in FIG. 1B1, the magnetic toroidal cylinder 100 is centered about a longitudinal axis 101. In certain embodiments, the magnetic toroidal cylinder 100 may include a first axial wall 102 (also called a side wall or radial wall) and a second or opposing axial wall 104 positioned a predetermined distance from the first axial wall 102 along the longitudinal axis 101. An outer cylindrical wall 106 and an inner cylindrical wall 108 are generally longitudinally positioned between the first axial wall 102 and the second axial wall 104.

In certain embodiments, the axial walls 102, 104 and cylindrical walls 106, 108 may be made of out magnetic material, such as: Neodymium, Alnico alloys, ceramic permanent magnets, electromagnets, Halbach Arrays, or the like.

FIG. 1B2 is an isometric view of one embodiment of a magnetic tunnel segment 150 which defines an interior space or "magnetic tunnel" 158. For instance, the magnetic tunnel segment 150 illustrated in FIG. 1B2 may be a portion of the magnetic toroidal cylinder 100 illustrated in FIG. 1B3.

Arrow 122 illustrates a circumferential direction with respect to the longitudinal axis 101 (not shown in FIG. 1B2) and arrow 124 illustrates a radial direction with respect to the longitudinal axis 101. Arrow 122 also indicates a relative circular path of motion.

For the particular magnetic tunnel segment 150, the north magnetic pole(s) of the magnet(s) forming the outer exterior wall 152 are orientated in a radial direction such that they face inward towards the interior space or tunnel 158. Similarly, the north magnetic pole(s) of the magnet(s) forming the inner interior wall 154 are orientated in a radial direction such that they also face inward towards the interior space or tunnel 158. Thus, both the outer exterior wall 152 and the inner interior wall 154 have their magnetic poles generally orientated in the radial direction with respect to the longitudinal axis 101 as indicated by the arrow 124 of FIG. 1B2. In contrast, the magnetic poles of the magnets forming the first axial wall 160 and the second axial wall 162 have their magnetic poles orientated generally parallel to the longitudinal axis 101.

Thus, in the illustrative embodiments of FIGS. 1B2 and 1B3, the individual magnets in the magnetic walls 152, 154, 160, and 162 all have their "like magnetic poles" orientated towards the interior space 158 or away from an interior space 158 enclosed by the walls 152, 154, 160, and 162 of the magnetic toroidal tunnel segment 150. The term "like magnetic poles" used in this disclosure refers to a group of magnetic poles of either all north poles or all south poles. For instance, the magnetic pole orientation or configuration illustrated in FIGS. 1B2 and 1B3 may be called a "NNNN" magnetic pole configuration because all of the magnets forming the magnetic walls 152, 154, 160 and 162 have their north poles facing inward.

In some embodiments, one or more of the magnetic walls may define a transverse slot. For instance, in the illustrative embodiment of FIG. 1B2. The outer exterior wall 152 and the first axial wall 160 may define a slot 112 or the inner cylinder wall 108 and/or outer cylinder wall 106 may define a slot 110. In certain embodiments, the slots 110, 112 may be wide enough to be used to enable the passage of a support structure, electrical wires and/or conduits or cooling conduits, but narrow enough to keep the flux forces from exiting through the slots.

FIG. 1B3 illustrates the complete magnetic toroidal cylinder 100 formed from combining four magnetic tunnel segments 150a through 150d arranged circumferentially around a common center or longitudinal axis 101 and inter-dispersed within four magnetic tunnel segments 180a through 180d. The poles of magnets creating the magnetic tunnel segments 150a through 150d are orientated in a specific geometric arrangement to form a NNNN magnetic configuration. The poles of magnets creating magnetic tunnel segments 180a through 180d are orientated in a specific geometric arrangement to form a SSSS magnetic configuration.

Coil Winding Assembly:

When the electric machine 10 is assembled, a coil winding assembly 500 is concentrically positioned between the outer exterior wall 152 and the inner interior wall 154, and also longitudinally positioned between the first axial wall 160 and the second axial wall 162 forming the magnetic toroidal cylinder 100. FIG. 1C1 is a detailed isometric view of a coil module 30. The coil winding assembly 500 may be formed by a plurality of coil modules 30 and pole positioned about a central core or yoke 42 (see FIG. 1C1 through 1D3).

FIG. 1C2 is a detailed exploded isometric view of the various components comprising the coil module 30 including a bobbin 36, a coil 526, a PCB module 32, and the first pole portion 34a.

In some embodiments, the bobbin 36 may be sized to be positioned onto a yoke 42, discussed below. In certain embodiments, the bobbin 36 may be made from a Polyether ether ketone (PEEK), which is a colorless organic thermoplastic polymer material or a glass-reinforced thermoplastic. The coil 526 surrounds and is wound around the bobbin 36. The coil 526 may be made from a conductive material wire, such as copper or a similar alloy. In other embodiments, concentrated windings may be used. In certain embodiments, the individual coils 526 may be essentially cylindrical, square, or rectangular in cross-sectional shape. The windings of each coil 526 are configured such that they are generally perpendicular to the direction of the relative movement of the magnets or rotor. In other words, the coil windings 526 are positioned such that their longitudinal sides are parallel with the longitudinal axis 101 and their ends or axial sides are radially perpendicular to the longitudinal axis 101. Thus, the coil windings 526 are also transverse with respect to the magnetic flux produced by the individual magnets of the rotor at their interior face. Consequently, essentially the entire coil winding 526 or windings may be used to generate motion in motor mode or voltage in generator mode.

The PCB module 32 is positioned radially adjacent to the inside face of the coil 526 and is electrically coupled to the coil 526. In certain embodiments, the PCB module 32 may include one or more sensors, including thermal sensors and Hall Effect sensors (not shown). In some embodiments, one or more of the thermal sensors may be a thermocouple. In yet other embodiments, there may be antennas and transceivers for wireless power transfer and/or communication transfer. In certain embodiments, there may be PCB connectors 37 that allow the coils 526 to plug directly into a brushless motor controller (not shown) or a PCB power module (not shown).

FIG. 1C3 is an isometric view of a coil module 30 sandwiched between two pole portions 34a and 34b. In some embodiments, the coil module 30 may be sandwiched between the two pole portions 34a and 34b for phasing purposes. In yet other embodiments, a "coil" for phasing purposes may actually be two physical coils 526 (and its associated bobbin 36 and PCB module 32) separated by the pole portions 34a or 34b. Positioning the coils 526 within the pole portions 34a and 34b reduced the air gap between the coils 526. By reducing the air gap, the coil winding assembly 500 can contribute more flux linkage to the overall torque produced by the motor. In certain embodiments, the first pole portion 34a and second pole portion 34b may operate together as a single pole for phasing purposes.

When the coil winding assembly 500 is energized, the current running through the coil windings 526 positioned within the magnetic tunnel segments 150a through 150d runs in an opposite direction than the current running through the coil windings positioned in the magnetic tunnel segments 180a through 180d so that the direction of the generated magnetic force or torque is the same throughout the entire magnetic toroidal cylinder 100.

In certain embodiments, the pole portion 34 is a flux concentrator and is formed such that one side of the coil 526 partially fits within an indent formed within the side of the respective pole portion. In certain embodiments, the pole portion 34 may be a solid material structure, which is sintered cast or 3D printed, solid block material, back iron material, and/or heatsink material. In some embodiments, the pole portion 34 may be made from aluminum and may be used as a heat sink to draw heat to either the back-iron circuit described below or another cooling mechanism or heat sink.

In yet other embodiments, the pole portion 34 may be formed of a "soft magnetic" material. In certain embodiments, an isolation spacer or heat sink (not shown) may be positioned on the central core 42 adjacent to the pole portion 34a or 34b. In some embodiments, the spacer may be made from a lightweight non-magnetic filler material, such as aluminum, TPG, carbon fiber, or plastic. In other embodiments, potting material may be used as a spacer. As described above, the magnets of the magnetic toroidal cylinder 100 focus the flux inwardly, but the poles and spacers can further direct the flux flow path as desired.

The Central Core or Yoke

FIG. 1D1 is an isometric view of a central core or yoke 40 for the coil winding assembly 500. The central core 42 may be made out of back iron material so that it will act as a magnetic flux force concentrator and distributes magnetic flux to each of the stator pole portions 34a and 34b. In some embodiments, the central core 42 may define one or more fluid communication passageways to allow for air or liquid cooling. In certain embodiments, the central core 42 may be made of at least two central core segments 42a and 42b.

The coil modules 30 are modular and the size of the bobbin 36 and pole portions 34a and 34b are designed to allow the PCB modules and pole portions to slide over the central core segments 42a and 42b. FIG. 1D2 is an isometric view of the central core segment 42a having two coil modules 30 positioned about the coil segment 42a. FIG. 1D3 is an isometric view of the central core segment 42a illustrating coil modules completely positioned over the central core segment 42a. Any number of coil modules 30 may be coupled depending on the particular application. In some embodiments, the coils 526 may essentially form one continuous coil 526, similar to a Gramme Ring.

FIG. 1E1 is an isometric view of a coil winding assembly 500 formed by joining the core portion illustrated in FIG. 1D3 with another core portion also having a full complement of coil modules 30 and a spider 604.

In some embodiments, the spider 604 assists with placement and alignment of the coil modules 30 and is designed to fit within a central interior space of the coil winding assembly 500 as illustrated. In certain embodiments, the spider 604 has a plurality of radial arms 610. At the distal end of each radial arms 610 is a dovetailed engagement notch 605. The engagement notch 605 is sized to be slid into the respective receiving slot 47 formed in the pole portions 34a and 34b (see FIG. 1C1) of the coil modules 30. The spider 604 helps align the individual coil modules 30 and indirectly joins the two central core segments 42a and 42b together.

Figure 1F:
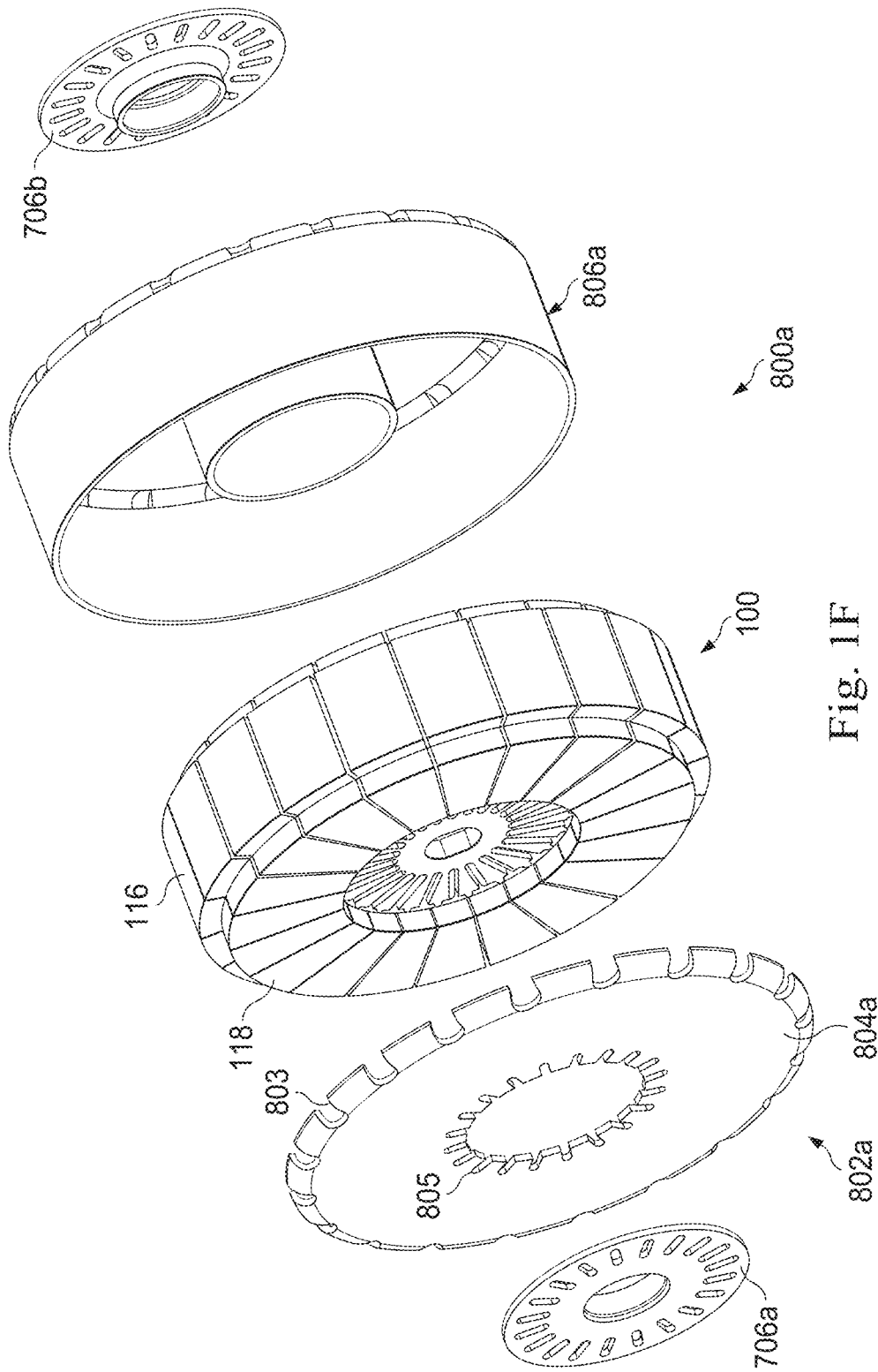
FIG. 1F is an isometric exploded view of the toroidal motor element and a back-iron circuit.

Once the spider 604 is in position, a PCB power module 640 can then be added to the coil winding assembly 500 as illustrated in FIG. 1F2. The PCB power module 640 is designed to fit within a central interior space of the coil winding assembly 500. In certain embodiments, the PCB connectors 37, as illustrated in FIGS. 1C1 through 1C3, can be electrically coupled to the PCB power module 640.

In some embodiments, the entire coil winding assembly 500 may be potted with a potting compound, which may be an epoxy material.

In order maintain the generated torque and/or power the individual coils 526 in the coil winding assembly 500 may be selectively energized or activated by way of a high-power electronic switching system or brushless motor controller 1204. In order to maintain rotation adjacent coils 526 may be powered up in turn. For instance, the brushless motor controller 1204 may cause current to flow within the individual coil 526 when the individual coil 526 is within a magnetic tunnel segment with a NNNN magnetic pole configuration. On the other hand when the same individual coil moves into an adjacent magnetic tunnel segment with a SSSS magnetic pole configuration, the brushless motor controller 1204 causes the current within the individual coil 526 to flow in the opposite direction so that the generated magnetic force is always in same direction.

The individual coils 526 may use toroidal winding without end windings and in some embodiments be connected to each other in series. In other embodiments, a three-phase winding may be used where adjacent coils 526 are connected together to form a branch of each phase. For instance, two adjacent coils 526 may be phase A coils, the next two adjacent coils 526 may be phase B coils, and the next two adjacent coils 526 may be phase C coils. This three-phase configuration would then repeat for all individual coils 526 within the coil winding assembly 500. When the coils 526 are energized, the three-phase winding can produce a rotating magnetic field in the air gap around the coil winding assembly 500. The rotating magnetic field interacts with the magnetic field generated by the toroidal magnetic tunnel producing torque and relative movement between the coil winding assembly 500 and the toroidal magnetic tunnel. That is, the brushless motor controller 1204 applies current to the phases in a sequence that continuously imparts torque to turn the magnetic toroidal cylinder 100 in a desired direction, relative to the coil winding assembly 500, in motor mode.

In certain embodiments, the brushless motor controller 1204 may be electrically coupled to the PCB power module 602 to form a power module assembly 606. In one embodiment, the power module assembly controller 606 may be designed to fit within an interior central cavity of the coil winding assembly 500 as illustrated in FIG. 1E2. In another embodiment, the power module assembly controller 606 may be potted.

In other embodiments, the electric machine 10 may have vents for air flow circulation. Such an embodiment is illustrated in the exploded isometric view of FIG. 1F. In this embodiment the first side wall 804a includes a plurality of outer notches or vents 803 defined around the outer circumference wherein the notches are sized to induce an air flow. There is also a plurality of inner notches or vents 805 defined around the inner circumference of the first side wall 804a.

As opposed to "pancake style" or axial flux electric machine 10, in certain embodiments, the longitudinal length or "width" of the outer circumferential wall 810 and inner circumferential wall 812 are greater than the radial depth or lateral length of the side walls 808a and 808b.

Although the central core 42, coil winding assembly 500, and magnetic tunnel segments 150, 180 are illustrated in cross-section as rectangular, any cross-sectional shape may be used depending on the design and performance requirements for a particular electric machine 10.

Advantages of Certain Embodiments

One of the advantages of this type of configuration over conventional electric motors is that the end turns of the coils 526 are part of the "active section" or force generation section of the electric machine 10. In conventional electric motors, only the axial length of the coils produces power, the end turns of the coils do not produce power and merely add weight and copper losses. However, as explained above, the entirely of the coil 526 is effectively utilized to produce torque because of the side axial walls 102, 104 or axial magnets. Therefore, for a given amount of copper more torque can be produced compared to a conventional electric motor.

In summation, surrounding the coils 526 with magnets creates more flux density and most of the magnetic forces generated are in the direction of motion so there is little, if any, wasted flux compared to a conventional electric motor. Further, because the forces are now all in the direction of motion more torque is generated and the configuration further minimizes vibration and noise compared to a conventional electric motor where the forces, depending on the polarity of the current in the coil may try and pull the coil downwards or push the coil upwards and therefore not in the direction of motion. Further, continuous torque and continuous power are greatly increased compared to a conventional electric motor as is the motor's torque density and power density by volume and weight. Even further, although the coil winding assembly 500 may be compact, the coils 526 are easily cooled because they are surrounded by an effective heat sink and since there is little to no overlap of the coil windings 526, there is little if any unwanted field induction which also contributes to a more efficient electric motor design. Further, these features and advantages can be expanded to include asynchronous and synchronous motor/generators that function without the use of permanent magnets. Such motors include embodiments for switched reluctance motors (SRM), induction motors (IM), reluctance synchronous motors (RSM) and the like.

Induction Machine Embodiment

An induction Motor (IM), unlike a Direct Current (D.C.) motor, in which the current has to be fed to the rotor by means of brushes and a commutator, is an Alternating Current (A.C.) motor or asynchronous motor in which the electric current in the rotor needed to produce torque is obtained by electromagnetic induction from the rotating magnetic field generated by the stator winding. The stator windings therefore provide not only the excitation magnetic field, but also the energy that is converted to mechanical output. In contrast, a Permanent Magnet (PM) motor is an AC motor that uses magnets imbedded into, or attached to, the surface of the motor's rotor to generate a constant motor flux instead of requiring the stator field to generate one by linking to the rotor.

The absence of brushes and a communicator in an IM is a major advantage when it comes to maintenance costs over the D.C. motor. The speed of this rotating magnetic field is known as the synchronous speed. In some embodiments, the rotating sinusoidal Magnetic Force (MMF) may be produced by the coil winding assembly 500 described herein for torque production. The interaction of the magnetic fields, that is the result of the current in the stator and the current induced in the rotor bars embedded in the surface of the rotor, produce a torque or tangential force on the rotor, which causes the rotor to start following the rotating magnetic field. The current generation requires a speed difference between the rotor and the rotating magnetic field. If the rotor were to catch the rotating magnetic field the induced rotor current would drop to zero, because there would be no relative motion between the two, and the rotor would slow down until there is once more relative motion and a tangential force on the rotor is produced. In this way, the rotor maintains a constant speed, which is just less than the speed of the rotating magnetic field or synchronous speed. This difference between the speed of the rotating field and the rotor speed is known as slip and may increase with load.

The AC supply for an IM is usually 3-phase, but a single-phase supply may be used with smaller IMs. For instance, a capacitor may be used with a single-phase supply to generate a supply current in a secondary or auxiliary winding that lags the phase of the single-phase supply in a primary winding during startup. The method of changing the direction of rotation of an IM depends on whether the motor is a three-phase or a single-phase machine. In the case of a three-phase supply, reversal is achieved by swapping the connection of any two-phase conductors. In a single-phase, split-phase machine, reversal can be achieved in machines not designed to have a fixed direction of rotation, by changing the connection between the primary winding and the start circuit.

Figure 2A:
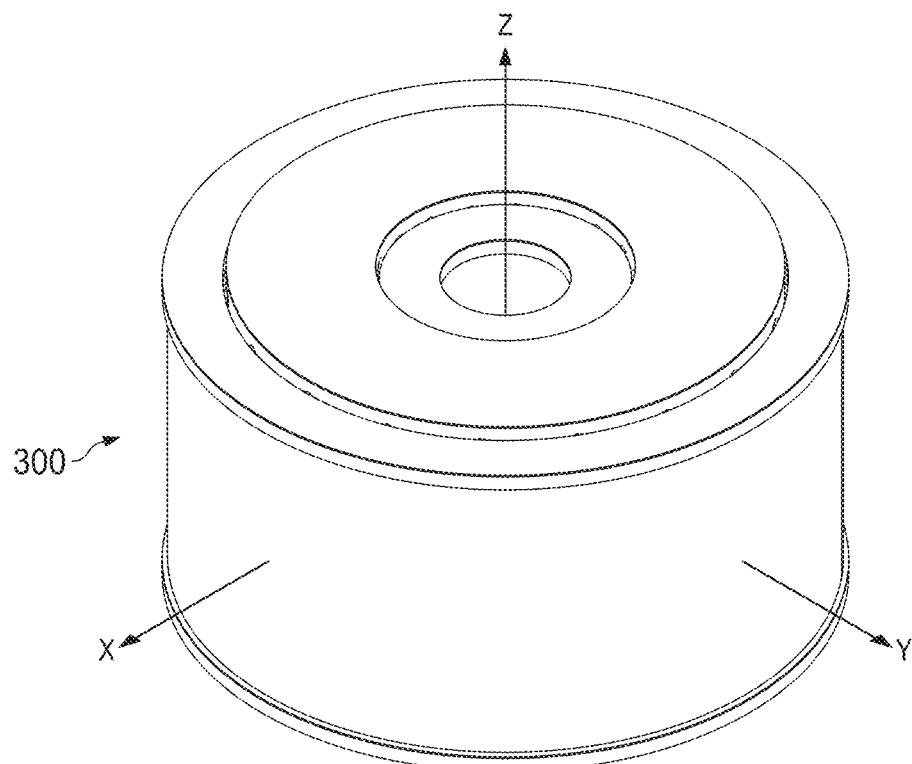
FIG. 2A is an isometric view illustrating one embodiment of an Induction Motor (IM) according to the principles of the present invention.

FIG. 2A is an isometric view illustrating one embodiment of an Induction Motor 300. Because a convention Induction Motor (IM) and a convention D.C. motor of similar power at a given speed will comprise substantially the same amount of copper and iron there may be no significant difference in size or weight between the two types of electric motors. However, in most instances the convention IM will be cheaper than the conventional D.C. motor because of its simpler construction. While the construction of the IM 300 illustrated in the embodiment of FIG. 2A may not be quite as simple as that of a conventional IM, the embodiment of FIG. 2A will be shown to have a higher energy density for a similar amount of copper and iron. In some instances, this higher energy density may be used to make more a powerful IM 300 of the same size. In other instances, the higher energy density may be used to make a smaller IM 300 of similar power at a given speed using a smaller amount of copper and iron.

An alternate use of the same mechanical configuration is as an Induction Generator (IG). In the following embodiments, the abbreviation IM 300 may therefore be extended to mean Induction Machine. Like, the induction motor the induction generator is also an asynchronous machine, that is the rotor(s) rotate below synchronous speed when operated as a motor and above asynchronous speed when operated as a generator. Unlike synchronous generators, which need to be "synchronized" with the electrical grid before they can generate power, the induction generator may be connected directly to the utility grid without the need for inverters or rectifiers. However, while the induction generator may provide power directly to the utility grid it does require a reactive power supply which the induction generator usually gets from the grid.

Figure 2B:
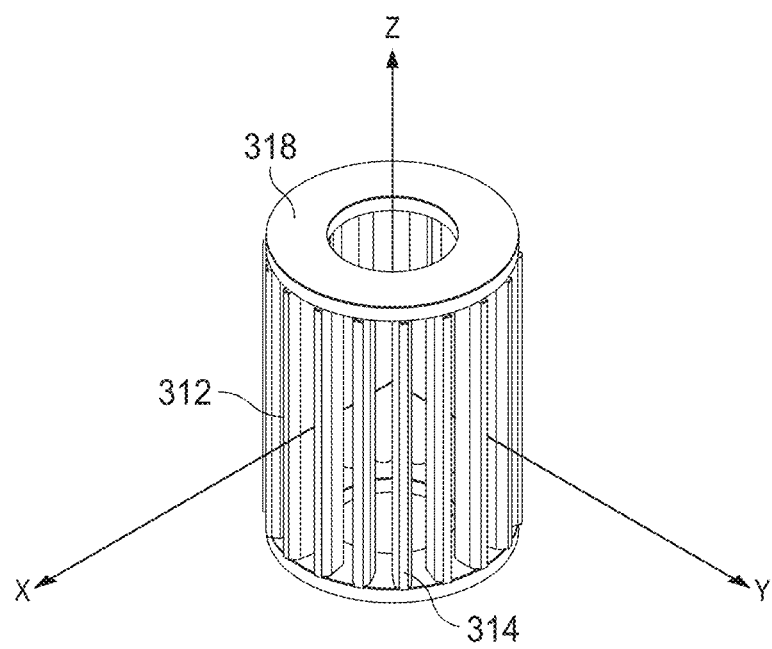
FIG. 2B is an isometric view illustrating an inner cage of an inner rotor of the induction motor.

FIG. 2B is an isometric view illustrating an inner rotor cage 312 of the inner rotor of the IM 300. The inner rotor cage 312 may comprise a plurality of inner rotor conductive bars 314. In some embodiments, the plurality of inner rotor conductive bars 314 may be parallel to, and radially space from the central longitudinal axis 101 of the inner rotor of the IM 300. In some embodiments the conductive bars 314 may be made of copper. In other embodiments the conductive bars 314 may be made of aluminum.

In some embodiments, the plurality of conductive bars 314 may be connected at both ends by inner shorting rings 318 to form a rings-and-bars structure that is cage-like in appearance and therefore similar or analogous to its namesake a squirrel cage. In certain embodiments, the inner shorting rings 318 may be made of copper. In other embodiments, the inner shorting rings 318 may be made of aluminum. Being economical, reliable, and self-starting the 3-phase squirrel cage IM 300 may be used in industrial applications, whereas the single-phase squirrel cage IM, being more suitable for smaller loads, may be used in domestic applications. Although traditionally used in fixed-speed applications, squirrel cage IMs are increasingly being used with variable-frequency drives (VFDs), in variable-torque applications, such as centrifugal fans, pumps, compressor load applications, and the like.

Figure 2C:
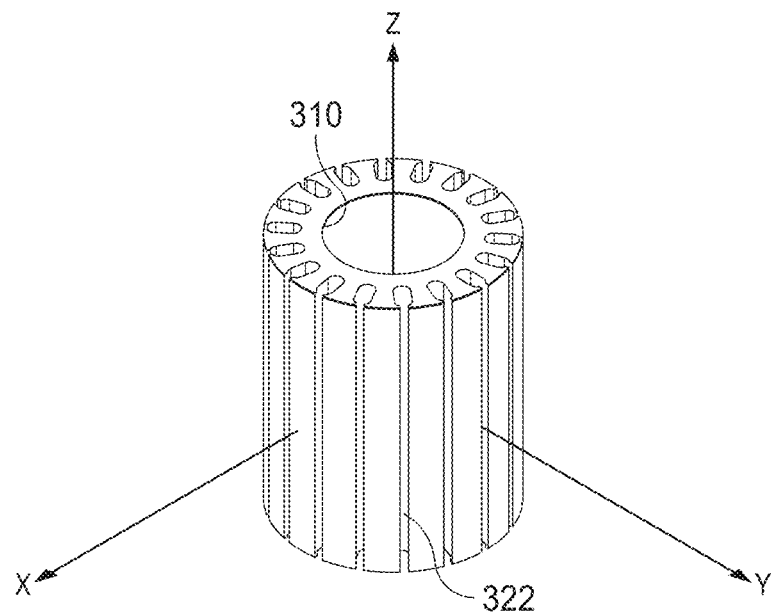
FIG. 2C is an isometric view illustrating an inner rotor core of the rotor of the induction motor

FIG. 2C is an isometric view illustrating an inner rotor core 310 of the inner rotor of an IM 300. In some embodiments, the inner rotor core 310 may comprise a solid core of iron or back iron so that the inner rotor core 310 will act as a magnetic flux field concentrator. That is, the back iron carries the magnetic field through the longitudinal conductive bars 314 of the inner rotor core 310.

Higher efficiency is always a requirement for electric machines and ideally the power losses in the IM 300 should be confined to the copper losses in the stator winding. However, while the inner rotor core 310 is not designed to have any current flow through it, it is however a conducting loop that experiences a changing magnetic field, therefore the inner rotor core 310 will have small currents induced in it that are proportional to the area of the loop formed by the inner rotor core 310. These induced currents are called eddy currents and the losses associated with these eddy currents and hysteresis must be added to the copper losses in the coil winding assembly 500.

Conventional electric motors have conventionally been made with either or both the stator core and the rotor core made of laminated ferromagnetic sheets that have an insulating coating on each side, which are stacked to form a core assembly. The thickness of the laminations is directly related to the level of heat losses produced by the electric motor when operating, which is commonly referred to as eddy current losses. The thinner the laminations, the less the eddy current losses.

In some embodiments, the inner rotor core 310 of the IM 300 may comprise laminated sheets of back iron material. For instance, the inner rotor core 310 may comprise a stack of cold-rolled laminated strips of electrical steel separated by a small airgap. In certain embodiments, the thickness of the laminated strips may be less than about 2 mm. In one embodiment, the air gap between adjacent laminations is less than about one-half mm thick.

In some embodiments, the inner rotor core 310 of the IM 300 may consist of a stack of rotor disks with evenly spaced groves 315 around the circumference. In certain embodiments, the rotor disks may be punched in sheets of electric steel. Electric steel, also known as lamination steel, silicon electrical steel, silicon steel, relay steel, and transformer steel, is an iron alloy tailored to produce specify magnetic properties: small hysteresis area resulting in low power loss per cycle, low core loss, and high permeability.

In certain embodiments, the laminated sheets may comprise non-oriented electrical steel sheets. Because the magnetic field in the inner rotor core 310 is alternating with time, the inner rotor core 310 may be constructed to further reduce core energy losses. In one embodiment, the inner rotor core 310 may be made of thin laminations which are electrically separated by an insulator to reduce eddy currents circulating in the inner rotor core 310. For instance, the steel laminations may be coated with an oxide layer. The oxide layer may act as an insulator preventing unwanted axial eddy currents from flowing in the rotor(s). In certain embodiments, the steel laminations may be coated with an insulating polyimide sheet, an aromatic nylon sheet, a synthetic fiber sheet, or other non-surface core plating electrically insulating sheet to further reduce the flux and current flow.

In some embodiments, the laminated sheets may be made from a 2D flux path material, such as, Cold-Rolled Grain-Oriented (CRGO) electrical steel. CRGO electrical steel may have a low carbon content but a high-silicon level of about 3% (Si: 11Fe). The small amount of silicon in CRGO electric steel, while making the electrical steel more brittle dramatically increase the resistivity of the electrical steel to several times that of pure iron, thereby further reducing eddy currents. The magnetic flux of CRGO electric steel may be about 30% higher in the cold-rolled direction. Electrical steel made without special processing to control the crystal orientation, that is, Cold-Rolled Non-Grain-Oriented (CRNGO) electrical steel, usually has a silicon level of 2% to 3.5%, and has similar magnetic properties in all directions. That is, CRNGO electrical steel is an isotropic material.

In some embodiments, the laminated sheets may be die cut to shape and stacked together to form the solid laminated inner rotor core 310 of the IM 300. Referring once more to embodiment illustrated in FIG. 2C, each of the laminated sheets has been cut into a disk having a circular aperture in a center of the disk for a rotor shaft and a plurality of grooves 315 evenly spaced about a circumference of the disk in which to locate the longitudinal conductive bars 314 of the inner rotor cage 312. In some embodiments, the electrical steel sheets may be coated to increase the electrical resistance between the laminations, to reduce eddy currents, provide resistance to corrosion or rust, and to act as a lubricant during die cutting process.

In some embodiments, the core(s) of the IM 300 may be constructed such that adjacent laminations having a first permeability are situated between laminations having a second permeability, or where a plurality of lower permeability laminations is situated between laminations having a higher permeability. In certain embodiments, there may be a plurality of lower permeability limitations situated between a plurality of higher permeability limitations.

These laminated stator or rotor structures creates a predominately 2D flux path inside the cores for the magnetic flux to follow when the IM 300 is in operation. Referring once more to the 4-rotor embodiment of FIG. 2A the flux may not act in substantially one direction. Therefore, 2D flux path material, such as CRGO electrical steel laminations used in a conventional electric motor may not be the best choice.

In some embodiments, a 3D flux path material may be used for the rotor core(s). The 3D flux path material may comprise a soft magnetic composite (SMC) material, for instance ferromagnetic particles that are individually surrounded by an insulating material or film, that, when bonded together into a solid block form a composite material that enables the magnetic flux to flow in any direction throughout the block with low eddy current losses. SMCs offer several advantages over traditional laminated steel cores in motor applications, which include three-dimensional (3D) isotropic ferromagnetic behavior, very low eddy current loss, relatively low total core loss at medium and high frequencies, possibilities for improved thermal characteristics, flexible machine design and assembly, and the potential for greatly reduced weight and production costs. Examples, of SMCs include: pure iron powder with resin; sintered iron-based powders, pure iron powder with additions of zinc stearate and carbon; iron-based powder alloys (Fe, Ni, Co, Si), and commercially available iron powder, such as "Somaloy." Further, many of the benefits of existing 3D flux path materials may be obtained by using a new type of 3D flux material.

In certain embodiments, the 3D flux material may be a ferromagnetic open cell metal foam material which is infused with a structural support matrix made of thermoset or a thermoplastic resin material. The ferromagnetic open cell metal foam material may be used as an alternative to the laminated or SMCs cores discussed above. A thermosetting polymer, resin, or plastic, often called thermoset, is a polymer that is irreversibility hardened by curing from a soft solid or viscous liquid prepolymer or resin. Curing can be induced by heat or suitable radiation and may be promoted by high pressure or mixing the thermoset with a catalyst. In other embodiments, the ferromagnetic open cell metal foam material may be infused with a dissimilar ferrous metal matrix. In yet other embodiments, the open cell metal foam material may be infused with a non-ferrous metal matrix.

In some embodiments, the ferromagnetic open cell foam core may be comprised of a roll of ferromagnetic metal foam material whose layers may or may not be separated from each other by an electrically insulating material. In certain embodiments, the ferromagnetic open cell metal foam core may be secondarily machined, pressed or formed by alternative means to a final desired shape. In one embodiment, the ferromagnetic open cell metal foam core may or may not have permanent magnets placed on or within the ferromagnetic open cell metal foam structure in a preferred location and orientation before the thermoset or thermoplastic resin matrix is infused and solidified.

In other embodiments, the ferromagnetic open cell form core may or may not have one or more wound magnetic wire coils inserted into a preferred location and orientation before the thermoset or thermoplastic resin matrix is infused and solidified. In certain embodiments, the ferromagnetic open cell metal foam core may or may not have an electronic PCB with discrete electronic components placed within the ferromagnetic metal foam core in a preferred location and orientation before the thermoset or thermoplastic resin matrix is infused and solidified.

In some embodiments, the composite of the thermoset material may be optimized for its magnetic properties. That is, the strands of the ferromagnetic open cell foam are made small enough in cross-section to prevent eddy current losses while carrying the magnetic flux of the electric motor. In certain embodiments, the composite of the thermoset material may be optimized for its mechanical proprieties. That is, the strands of the ferromagnetic open cell metal foam may be configured to act as a "structural fiber" that is supported by the thermoset or thermoplastic resin matrix which distributes the structural loads from one "structural fiber" to the next. In one embodiment, the composite of the thermoset material may be configured to balance the magnetic and mechanical properties. In either case, the resulting ferromagnetic metal foam composite core motor structure(s) would result in an electric motor that is substantially lighter in weight than existing motors available on the market, and enable a significantly higher torque density than existing electric motors, whether they be of the 2D or 3D flux path motor architecture type.

In some embodiments, the porosity of the ferromagnetic open cell metal foam material may be between about 75% and about 95% by volume. In certain embodiments, the strength of the ferromagnetic open cell metal foam material may be proportional to its density. For instance, the strength of the open cell metal foam material may be a power law with respect to its density. That is, an open cell metal foam material having a porosity of about 20% may be more than twice as strong as an open cell metal foam material having a porosity of about 10%.

Figure 2D:
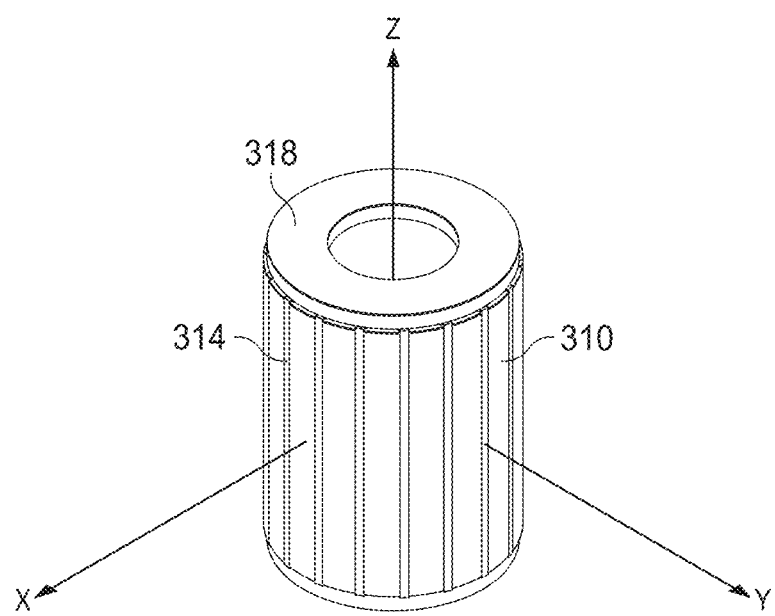
FIG. 2D is an isometric view illustrating the inner rotor core of FIG. 2C to form an inner squirrel-cage rotor core assembly of the induction motor.

FIG. 2D is an isometric view illustrating the inner rotor core 310 of FIG. 2C coupled to the inner rotor cage 312 of FIG. 2B to form an inner rotor core assembly 316 of the IM 300. In the illustrated embodiment of FIG. 2D, the longitudinal conductive bars 314 are set into the groves 315 and connected at both ends by the inner shortening rings 318. In some embodiments, the conductive bars 314 may be inserted into the groves 315 after the laminations have been stacked and welded or brazed to the end-rings 318. In certain embodiments, there may be no insulation layer between the longitudinal conductive bars 314 and the groves 315 of the inner rotor core 310. In other embodiments, the longitudinal conductive bars 314 may be poured into the groves 315 of the inner rotor core 310 after the laminations have been stacked using a die-cast process. In one embodiment, the number of groves 315 in the inner rotor core 310 may be greater than a number of slots in the stator or coil winding assembly 500 of the IM 300. Further, the number of groves 315 in the inner rotor core 310 may be a non-integer multiple of the number of slots in the stator of to prevent magnetic interlocking of the inner rotor core 310 and the stator teeth at startup. Unlike a D.C. motor the inner rotor core 310 of the IM 300 is non-salient.

In the illustrative embodiment of FIG. 2D, the longitudinal conductive bars 314 are parallel to, and radially space from, the central longitudinal axis 101 of the inner rotor of the IM 300. Squirrel-cage IMs are self-starting, simple, rugged, and maintain a reasonably constant speed, determined by the supply frequency and the number of poles of the stator winding, from light load to full load. By adjusting the shape of the conductive bars 314 in the inner rotor core 310 the speed-torque characteristics of the IM 300 can be changed. For instance, the low-speed torque or starting current.

In some embodiments, the conductive bars 314 may be skewed slightly along the length of the inner rotor core 310. For instance, the conductive bars 314 may be skewed to avoid magnetic locking. In certain embodiments, the skew of the conductive bars 314 may be chosen to reduce the noise of the IM 300. In one embodiment, the skew of the conductive bars 314 may be chosen to reduce torque fluctuations. In another embodiment, the skew may be configured to prevent cogging at start-up by ensuring that the same fraction of each conductor bar 314 is under each stator slot to ensure a better transformation ratio between the rotor and the stator. In yet another embodiment, the number conductor bars 314 may be a prime number.

In some embodiments, the shape of the conductive bars 314 may be dependent on the number of phases. That is, the shape of conductive bars 314 for a single-phase IM 300 may be different from the shape of the conductive bars 314 for a three-phase IM 300. For instance, the depth of the conductive bars 314 may be greater in a three-phase machine IM 300. In one embodiment, the shape or depth of the conductive bars 314 may be used to vary the speed-torque characteristics of the IM 300. In certain embodiments, the profile of the conductive bars 314 may be tapered. By tampering the profile of the conductive bars 314, the resistance of the conductive bars 314 can be made to vary with depth and thereby frequency or slip. For instance, thicker and deeper conductive bars 314 may provide higher torque and be more efficient at low slip because they have a lower resistance to back emf. Whereas, conductive bars 314 that are thicker at the surface or outer edges may be more efficient at start-up, in 3-phase applications, or at high slip.

In some embodiments, the squirrel cage may be a double squirrel cage. For instance, a combination of a high impedance conductive bars 314a and low impedance conductive bars 314b may be arranged in parallel. This arrangement of high impedance conductive bars 314a in parallel with low impedance conductive bars 314b may be configured to produce more torque at standstill and near the asynchronous speed of the IM 300. Alternatively, this arrangement may be configured to produce less torque at standstill and near the asynchronous speed of the IM 300. In certain embodiments, the shape of the conductive bars 314 may not vary between applications. For instance, the same squirrel cage construction may be used for both single-phase and three-phase IM 300 applications.

In certain embodiments, the inner rotor squirrel cage 312 may be an inner rotor loop squirrel cage 312. For instance, the individual inner rotor conductive bars 314 may be an inner rotor conductive loop or coil 314 that is essentially cylindrical, square, or rectangular in cross-sectional shape. In certain embodiments, the plurality of inner conductive loops 314 may be arranged within the inner rotor core 310 in a way that is similar to the coils 526 of the winding assembly 500, however each of the individual inner rotor conductive loops 314 may be electrically isolated from each adjacent inner rotor conductive loop 314 by the material of the inner rotor core 310 or an insulating material. In another embodiment, the loop squirrel cage 312 may omit the two end-rings 318. In yet another embodiment, the loop squirrel cage 312 may be formed by a plurality of inner rotor conductive loops 314 positioned or stacked about a central yoke.

Figure 2E:
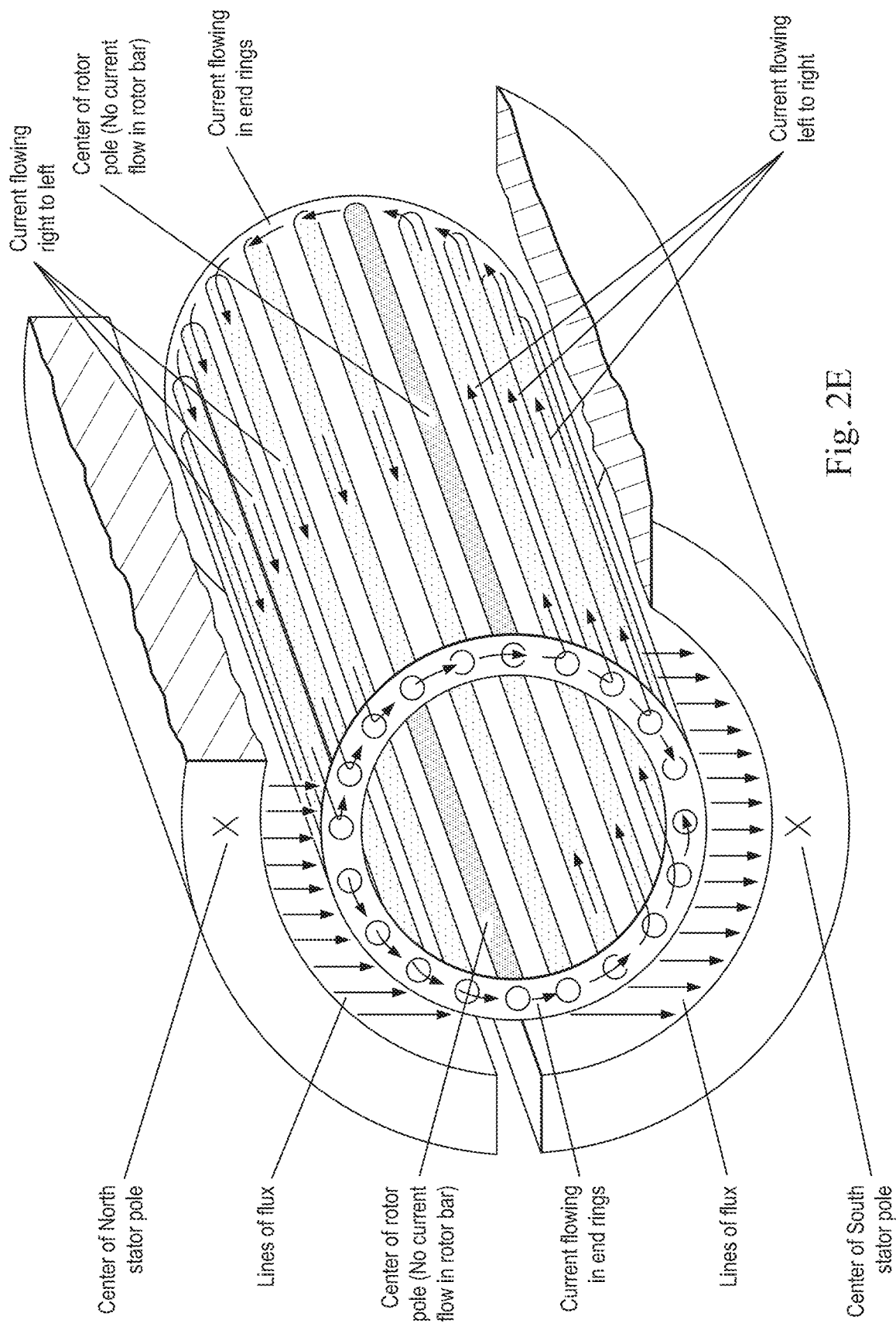
FIG. 2E is an isometric view illustrating the current flow in the conductive bars of inner cage of the rotor of an induction motor.

FIG. 2E is an isometric view illustrating the current flow in the of inner rotor cage 312 of the inner rotor of the IM 300. In both asynchronous IM 300 and synchronous motors, the A.C. power supplied to the motor's stator creates a magnetic field that rotates in synchronism with the AC oscillations. Whereas a synchronous motor's rotor turns at the same rate as the stator field, the inner rotor core assembly 316 of an IM 300 rotates at a somewhat slower speed than the stator field. The IM 300 stator's magnetic field is therefore changing or rotating relative to the inner rotor core assembly 300. This induces an opposing current in the IM's 300 inner rotor cage 312, when the latter is short-circuited or closed through an external impedance, such as the two end-rings 318. The induced currents in turn create magnetic fields in the inner rotor assembly 316 that react against the stator field. Due to Lenz's Law, the direction of the magnetic field created will oppose the change in current through the conductors 314 of the inner rotor cage 312. The cause of induced current in the conductors 314 of the inner rotor cage 31 is the rotating stator magnetic field, so to oppose the change in rotor currents the inner rotor assembly 316 will start to rotate in the direction of the rotating stator magnetic field. The inner rotor assembly 316 accelerates until the magnitude of induced rotor current and torque balances the applied mechanical load on the rotation of the inner rotor assembly 316. Since rotation at synchronous speed would result in no induced rotor current, the IM 300 always operates slightly slower than synchronous speed. The ratio between the rotation of the magnetic field induced in the inner rotor assembly 310 and the rotation of the stator's rotating field is called "slip" and varies from about 0.5% to 5.0% for conventional IMs. Under load, the speed of the inner rotor assembly 316 drops and the slip increases until sufficient torque is generated to turn the load. It is for this reason that IM may be referred to as "asynchronous motors".

Although the time-varying magnetic field of the coil winding assembly 500 induces an electromotive force (emf) in every conductor bar 314 of the same magnitude and frequency, the phase of the induced emf's will be different. In the illustrative embodiment of FIG. 2E, the conductive bars 314 under the representative N pole(s) of the field will have the maximum positive voltage across them, and those under the representative S pole(s) will have the maximum negative voltage across them. That is, the phase of the voltage in the conductive bars 314 under the S pole(s) will be shifted 180 degrees with respect to the phase of the voltage in the conductive bars 314 under the N pole(s), and the phase of the voltage in the conductive bars 314 between the N pole(s) and the S pole(s) will progressively shift through 180 degrees. Specifically, the phase of the induced emfs in the conductive bars 314 will track that of the flux density wave produced by the coil winding assembly 500.

As illustrated in FIG. 2E the ends of the conductive bars 314 are short circuited by the two end-rings 318. Therefore, the induced emfs will drive currents along the conductive bars 314 and through the two end-rings 318 as shown. The two end rings 318 may be constructed to carry current from more than a single pair of conductive bars 314. In certain embodiments, the current carrying cross-sectional area of the two end rings 318 is greater than the current cross-sectional area of an individual conductive bar 314. In one embodiment, the two end rings 318 may be configured for a current density of between about 6 A mm-2 and about 4 A mm-2. In another embodiment, the two end rings 318 may be configured for a current density greater than about 6 A mm-2 because of the heatsinking capabilities of the inner rotor core 310.

The axial currents in the conductive bars 314 of the inner rotor cage 312 will interact with the radial flux wave to produce the driving torque of the IM 300 in the same direction as the rotating field. That is, the inner rotor assembly 316 will be dragged along by the field. While the illustrative embodiment of FIG. 2E only shows a single north south pole pair, it will be understood that the inner rotor cage 312 will automatically adapt to whatever number of poles is induced by the coil winding assembly 500. That is, the inner rotor core assembly 316 can be used with different coil windings assembly 500 phase configurations without modification.

As is known by a person having ordinary skill in the art a convention AC IM consists of an internal squirrel-cage rotor core assembly that is enclosed by coils of the stator winding. In contrast, in some embodiments of the present invention the inner rotor core assembly 316 of the disclosed AC IM 300 may further comprise an outer rotor core assembly 336 having an outer rotor cage 332.

Figure 2F:
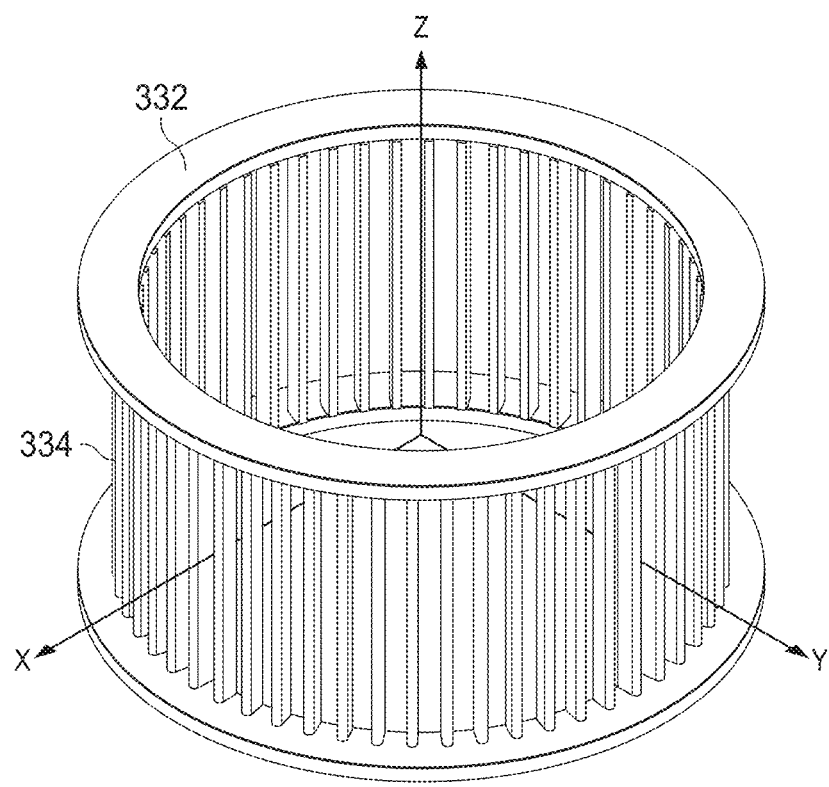
FIG. 2F is an isometric view illustrating an outer rotor cage of the rotor of an induction motor.

FIG. 2F is an isometric view illustrating an outer rotor cage 332 of the rotor core assembly 336 of an IM 300. The outer rotor cage 332 may comprise a plurality of outer conductive bars 334. In some embodiments, the plurality of outer conductive bars 334 may be parallel to, and radially spaced from the central longitudinal axis 101 of the inner rotor core assembly 316 of the IM 300. The outer conductive bars 334 may be made of copper or aluminum. In certain embodiments, the plurality of outer conductive bars 334 may be connected at both ends by outer shorting rings 338 to form a rings-and-bars structure that is cage-like in shape. The outer shorting rings 338 may be made of copper or aluminum.

Induced emfs will drive current along the conductive bars 334 and through the two end-rings 338 as shown. Therefore, he two end rings 338 may be constructed to carry current from more than a single pair of conductive bars 334. In certain embodiments, the current carrying cross-sectional area of the two end rings 338 is greater than the current cross-sectional area of an individual conductive bar 314. In one embodiment, the two end rings 318 may be configured for between about 6 A mm-2 and about 4 A mm-2. In yet another embodiment, the two end rings 338 may be configured to carry a current greater than about 6 A mm-2 because of the heatsinking capabilities of the outer rotor core 330.

In certain embodiments, the outer rotor squirrel cage 332 may be an outer rotor loop squirrel cage 332. For instance, the individual outer rotor conductive bars 334 may be an outer rotor conductive loop or coil 334 that is essentially cylindrical, square, or rectangular in cross-sectional shape. In certain embodiments, the plurality of outer conductive loops 334 may be arranged within the outer rotor core 330 in a way that is similar to the coils 526 of the winding assembly 500, however each of the individual outer rotor conductive loops 334 may be electrically isolated from each adjacent outer rotor conductive loop 334 by the material of the outer rotor core 310 or an insulating material. In another embodiment, the outer rotor loop squirrel cage 332 may omit the two end-rings 338. In yet another embodiment, the loop squirrel cage 332 may be formed by a plurality of outer conductive loops 334 positioned or stacked about a central yoke.

Figure 2G:
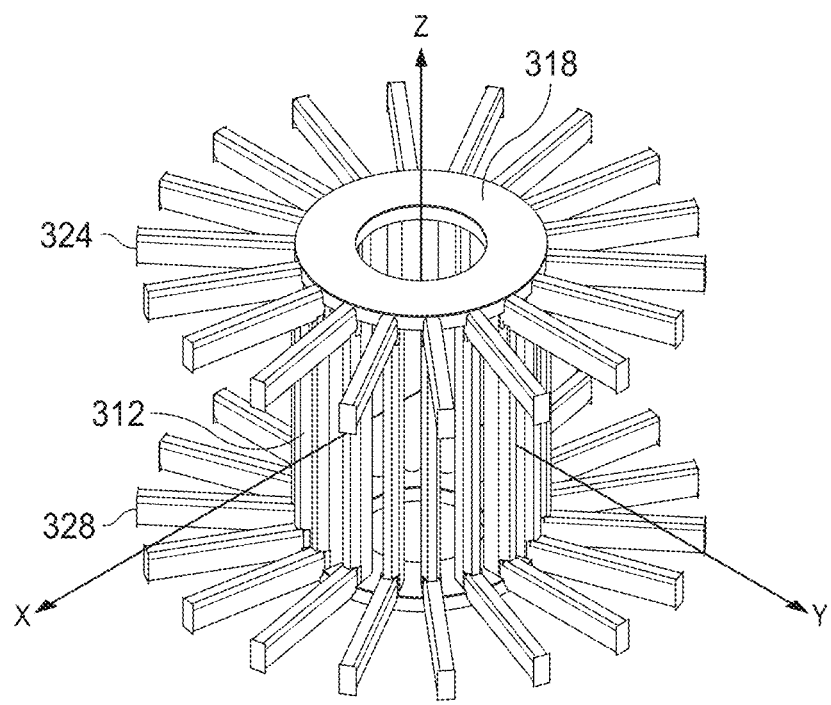
FIG. 2G is an isometric view illustrating a first set of axial spokes and a second set of axial spokes attached to the inner cage of the rotor core assembly of FIG. 2B.

FIG. 2G is an isometric view illustrating a first set of axial spokes 324 and a second set of axial spokes 344 attached to the inner rotor cage 312 of FIG. 2B. In certain embodiments, the first set of axial spokes 324 may comprise a first plurality of axial rotor conductive bars 324 connected to, and radiating from, the first inner shorting ring 318, and the second set of axial spokes 344 may comprise a second plurality of conductive bars 324 connected to, and radiating from, the second inner shorting ring 318. In one embodiment, each axial spoke of the first set of axial spokes 324 and the second set of axial spokes 344 may be connected to one of the shorting rings 318 and an end of the one of the plurality of inner rotor conductive bars 314 that are parallel to, and radially spaced from, the central longitudinal axis 101 of the inner rotor core 310 of the IM 300 as illustrated in FIG. 2G.

Figure 2H:
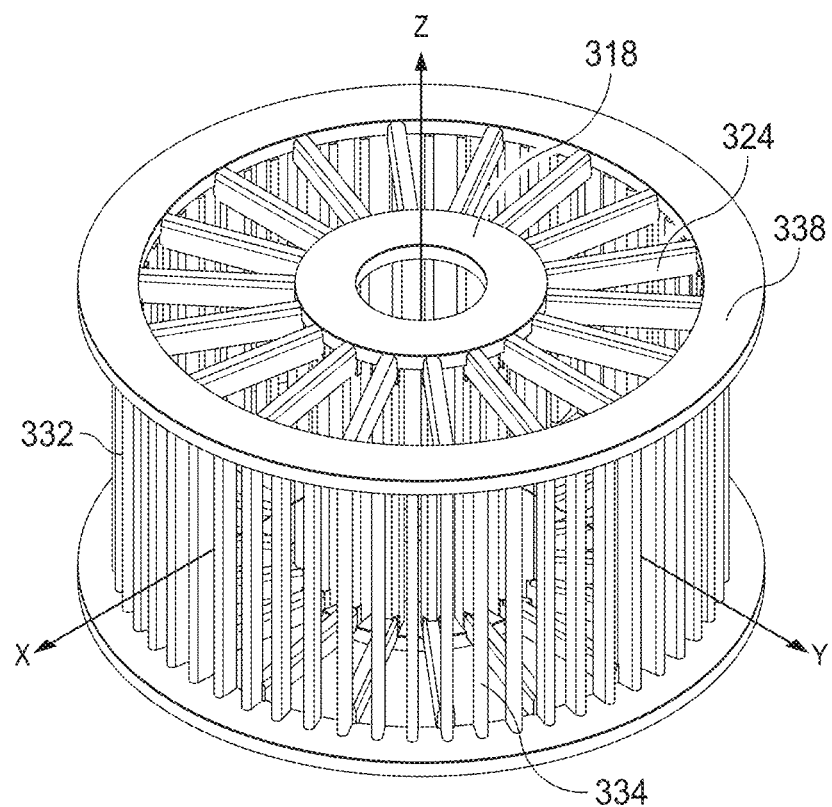
FIG. 2H is an isometric view illustrating the assembly of FIG. 2G attached to the outer rotor cage assembly of FIG. 2F.

FIG. 2H is an isometric view illustrating the assembly of FIG. 2G attached to the outer rotor cage 332 of FIG. 2F. In some embodiments, the first set of axial spokes 324 may be configured to connect the first inner shorting ring 318 of the inner rotor cage 312 to the first outer shorting ring 338 of the outer rotor cage 332, and the second set of axial spokes 348 may be configured to connect the second inner shorting ring 318 of the inner rotor cage 312 to the second outer shorting ring 338 of the outer rotor cage 332. In one embodiment, the number of conductive bars 324 in the first set of axial spokes 324, or the second set of axial spokes 344, may be equal to the number of conductive bars 314 in the inner rotor cage 312 or the outer rotor cage 332. In certain embodiments, the number of conductive bars 314 in the inner rotor cage 312 may be different from the number of conductive bars 334 in the outer rotor cage 332. In some embodiments, the plurality of outer conductive bars 334 may be parallel to, and radially spaced from the central longitudinal axis 101 of the inner rotor core 310 of the IM 300. At least one set of axial spokes 326, 328 may be made of copper or aluminum. In one embodiment, at least one set of axial spokes 326, 328 may be configured to transfer loads between the inner rotor cage 312 and the outer rotor cage 332.

In some embodiment, the impedance of the inner rotor cage 312 and the outer rotor cage 332 may be different. For instance, a combination of a high impedance conductive bars 314, 334, and low impedance conductive bars 314, 334, may be arranged in parallel in each of the rotor cages 312, 332. Alternatively, while the impedance of the individual conductive bars 314, 334 in the inner rotor cage 312 and the outer rotor cage 332 may be substantially the same, the outer rotor cage 332 may comprise more conductive bars 334 in parallel than the inner rotor cage 312. This arrangement of high impedance conductive bars 314, 334 in parallel with low impedance conductive bars 314, 334 may be configured to produce more torque at standstill and near the asynchronous speed of the IM 300. Alternatively, this arrangement may be configured to produce less torque at standstill and near the asynchronous speed of the IM 300.

Figure 2I:
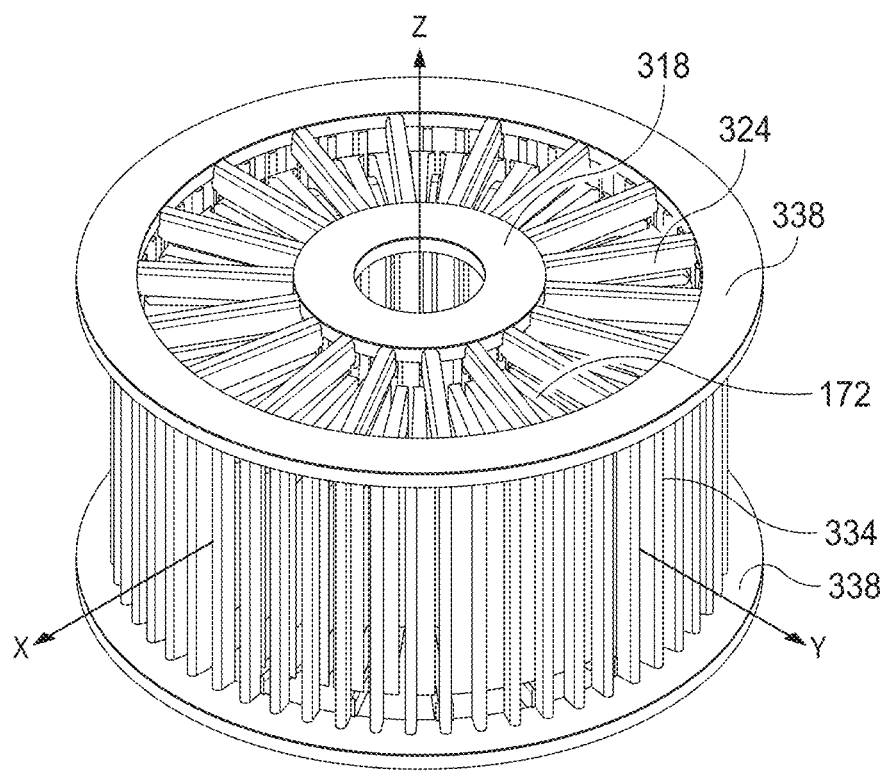
FIG. 2I is an isometric view of the outer rotor core.

FIG. 2I is an isometric view illustrating a coil winding assembly 500, or stator, within the rotor cage assembly of FIG. 2H. That is, in some embodiments, the rotating sinusoidal MMF may be produced by the coil winding assembly 500 of the stator described herein for torque production.

Figure 2J:
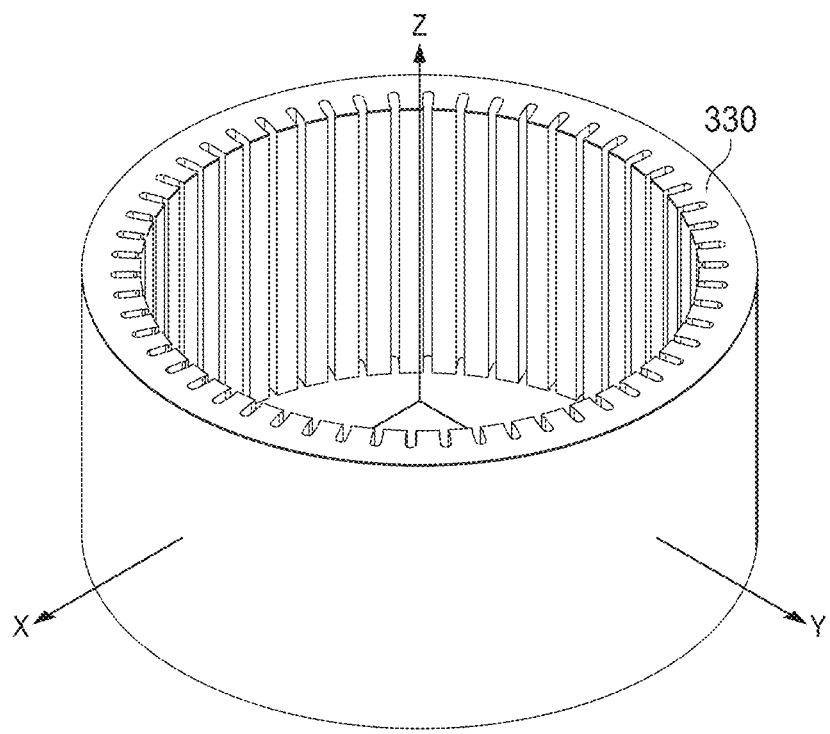
FIG. 2J is an isometric view illustrating the outer rotor cage coupled to the outer rotor core.

FIG. 2J is an isometric view illustrating an outer rotor core 330 of an outer rotor of the IM 300. In some embodiments, the outer rotor core 330 may comprise a solid core of iron or back iron so that the outer rotor core 330 will act as a magnetic flux field concentrator. That is, the back iron carries the magnetic field through the longitudinal conductive bars 334 of the outer rotor core 330. In some embodiments, the outer rotor core 330 may comprise laminated sheets of back iron material. For instance, the laminations may comprise CRGO laminated strips of electrical steel. In certain embodiments, the laminated sheets may comprise non-oriented electrical steel sheets. Because the magnetic field in the outer rotor core 330 is alternating with time, the outer rotor core 330 may be constructed to reduce outer rotor core 330 energy losses. In one embodiment, the outer rotor core 330 may be made or thin laminations which are electrically separated by an insulated layer to reduce eddy currents circulating in the outer rotor core 330. In one embodiment, the laminated sheets may comprise CRNGO electrical steel sheets.

In some embodiments, the laminated sheets may be die cut to shape and stacked together to form the solid laminated outer rotor core 330 of the IM 300. Referring once more to the embodiment illustrated in FIG. 2J, each of the laminated sheets has been cut into a circular rim having a plurality of grooves 322 evenly spaced about an inner edge of the rim in which to locate the longitudinal conductive bars 334 of the outer rotor cage 332. In some embodiments, the laminated electrical steel sheets may be coated to increase electrical resistance between the laminations, to reduce eddy currents, provide resistance to corrosion or rust, and to act as a lubricant during die cutting.

Figure 2K:
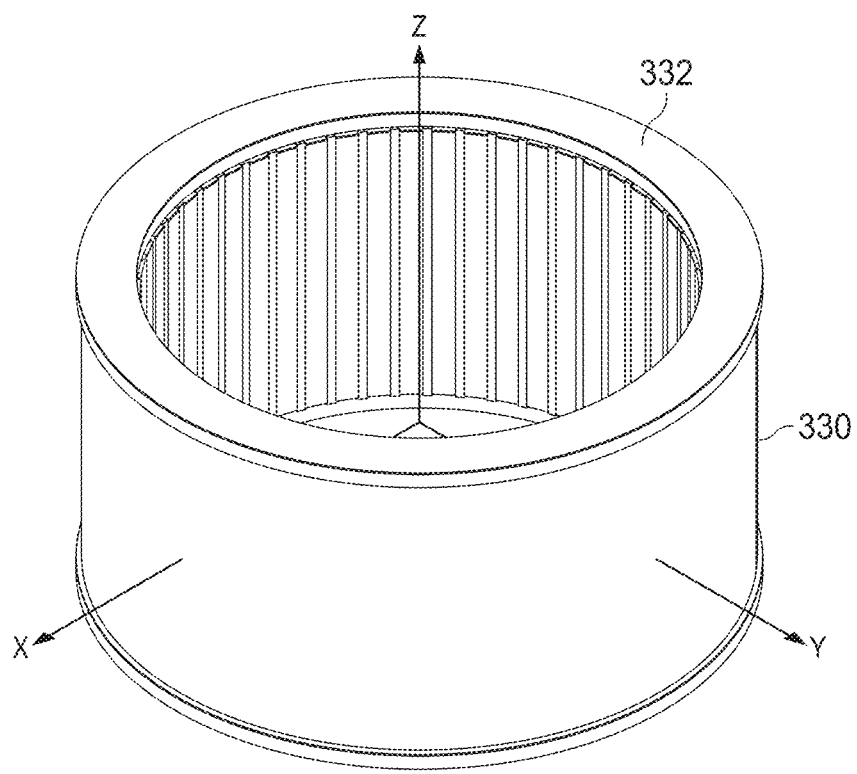
FIG. 2K is an isometric view illustrating the outer rotor core of the coupled to the outer rotor cage to form an outer squirrel-cage rotor core assembly of the induction motor.

FIG. 2K is an isometric view illustrating the outer rotor core 330 of FIG. 2J coupled to the outer rotor cage 332 of FIG. 2F to form an outer rotor core assembly 336 of the IM 300. In the illustrated embodiment of FIG. 2K the longitudinal conductive bars 334 are set into the groves 335 and connected at both ends by the shortening end-rings 338 of the outer rotor cage 332. In some embodiments, the conductive bars 334 may be inserted into the groves 335 after the laminations have been stacked and welded or brazed to the end-rings 338 of the outer rotor cage 332. In certain embodiments, there may be no insulation layer between the conductive bars 334 and the groves 335 of the outer rotor core 330. In certain embodiments, the conductive bars 334 may be poured into the groves 335 of the outer rotor core 330 after the laminations have been stacked using a die-cast process. In some embodiments, the number of groves 335 in the outer rotor core 330 may be greater than a number of slots in the stator of the IM 300. Further, the number of groves 335 the outer rotor core 330 may be a non-integer multiple of the number of slots in the stator to prevent magnetic interlocking of the rotor(s) and the stator teeth at startup. Furthermore, unlike a D.C. motor the outer rotor core assembly 336 of the IM 300 is non-salient. That is, the surface of the outer rotor core assembly 336 is substantially smooth.

Figure 2L:
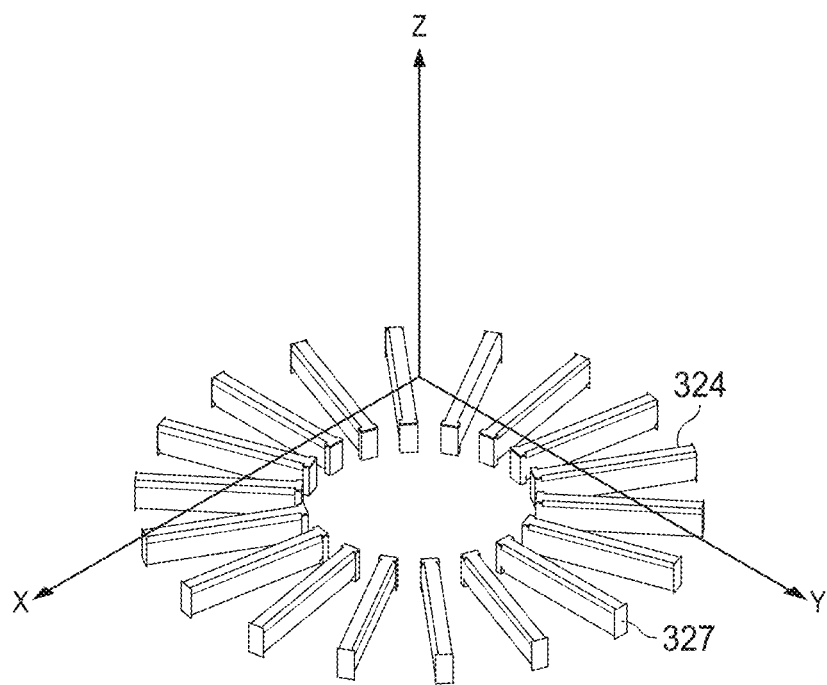
FIG. 2L is an isometric view illustrating one set of axial spokes.

FIG. 2L is an isometric view illustrating a first set of axial spokes 324. In some embodiments, the first set axial spokes 324 may comprise a plurality of first axial rotor conductive bars 324 radiating from the center of the IM 300. In some embodiments, the first set of axial spokes 324 may function as connecting rods between the inner rotor cage 312 and the outer rotor cage 332 of the IM 300. In certain embodiments, the first plurality axial conductive bars 324 may be configured to connect the inner rotor conductive bars 314, of the inner rotor cage 312, to the outer rotor conductive bars 334, of the outer rotor cage 332. In one embodiment, the number of conductive bars 324 in the first set of axial spokes 324 may be equal to the number of conductive bars 314 in the inner rotor cage 312 or the outer rotor cage 332. In some embodiments, the first axial conductive bars 324 may be made of copper. In certain embodiments, the first axial conductive bars 324 may be made of aluminum. In one embodiment, the first set of axial spokes 324 may function as connecting rods between the inner rotor cage 312 and the outer rotor cage 332. In one embodiment, the first set of axial spokes 324 may be configured to transfer loads between the inner rotor core assembly 316 and the outer rotor core assembly 336.

Figure 2M:
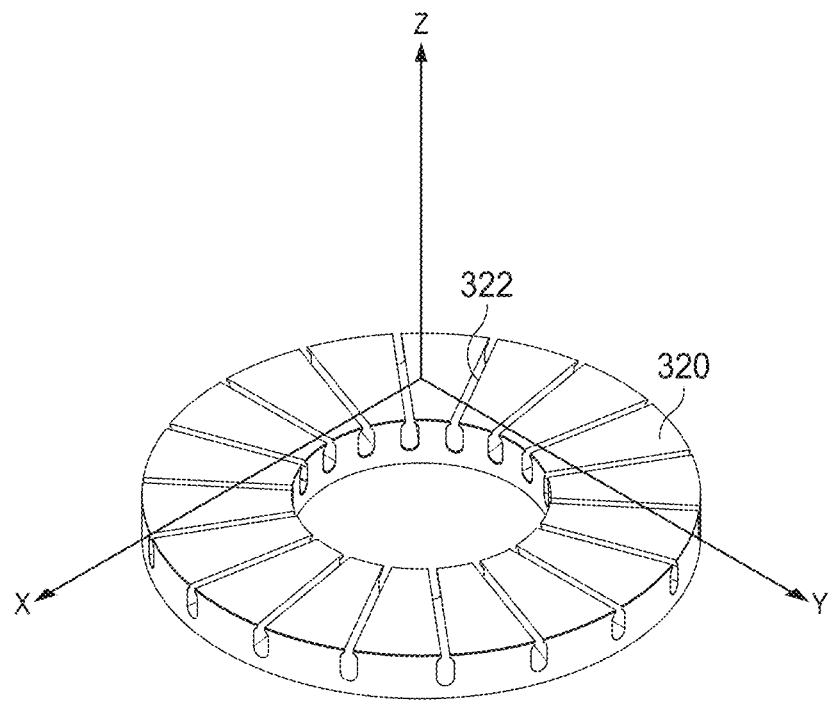
FIG. 2M is an isometric view illustrating an axial core.

FIG. 2M is an isometric view illustrating a first axial rotor core 320. In some embodiments, the first axial rotor core 320 may comprise a solid core of iron or back iron so that the first axial rotor core 320 will act as a magnetic flux field concentrator. That is, the back iron carries the magnetic field through a plurality of conductive bars 324 radiating from the center of the IM 300. In some embodiments, the first axial rotor core 320 may comprise laminated sheets of back iron material. For instance, the laminations may comprise CRGO laminated strips of electrical steel. In certain embodiments, the laminated sheets may comprise non-oriented electrical steel sheets. Because the magnetic field in the first axial rotor core is alternating with time, the first axial rotor core 320 may be constructed to reduce first axial rotor core 320 energy losses. In one embodiment, the first axial rotor core 320 may be made of thin laminations which are electrically separated by an insulated layer to reduce eddy currents circulating in the first axial rotor core 320. In one embodiment, the laminated sheets may comprise CRNGO electrical steel sheets.

In some embodiments, the laminated sheets may be die cut to shape and stacked together to form the solid laminated first axial rotor core 320 of the IM 300. For instance, each of the laminated sheets may be cut into a disk having circular aperture in a center of the disk for the rotor and a plurality of grooves 322 radiating from the center of the disk in which to locate the plurality of conductive bars 324 radiating from the central longitudinal axis 101 of the IM 300.

Figure 2N:
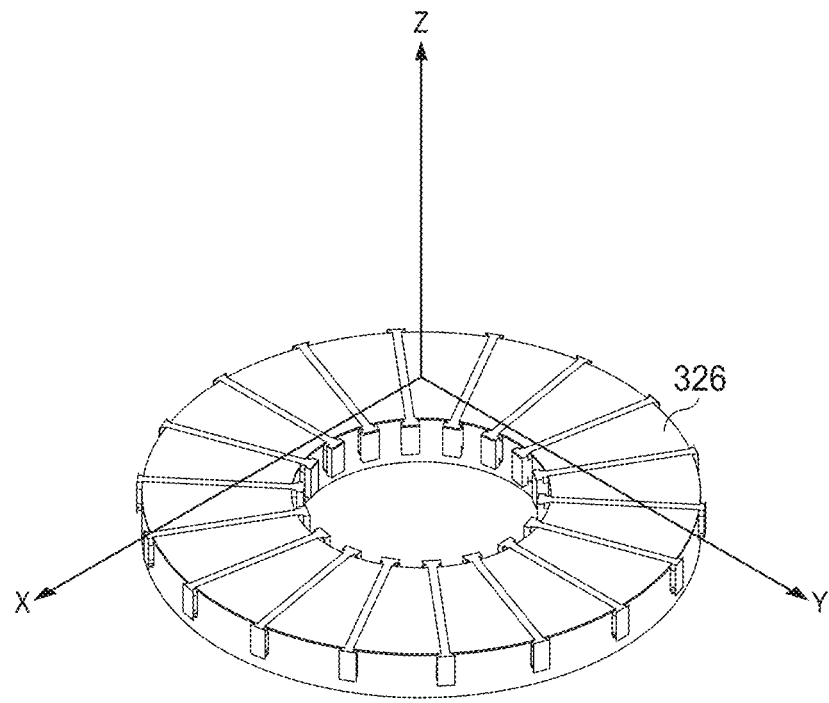
FIG. 2N is an isometric view illustrating one set of axial spokes coupled to the axial core of FIG. 2M to form an axial core assembly.

FIG. 2N is an isometric view illustrating a first set of axial spokes 324 coupled to the first axial rotor core 320 of FIG. 2M to form a first axial rotor core assembly 326. In some embodiments each of the first set of axial spokes 324 may be inserted into the plurality of groves 322 radiating from the center of the first axial rotor core 320 after the laminations have been stacked. In certain embodiments, one or more of the first set of axial spoke(s) 324 may have a shape that is analogous or similar to that of an I-beam or an H-beam when viewed from a direction that is perpendicular to the surface of the first axial rotor core assembly 326. In one embodiment, an edge of one or more of the first set of axial spoke(s) 324 may extend radially beyond the first axial rotor core 320 to form a fastening pin 327 configured to interlock with a corresponding fastening tail (not shown). In one embodiment, the outer rotor core assembly 336 may have at least one aperture corresponding to the shape of the fastening tail.

Figure 2P:
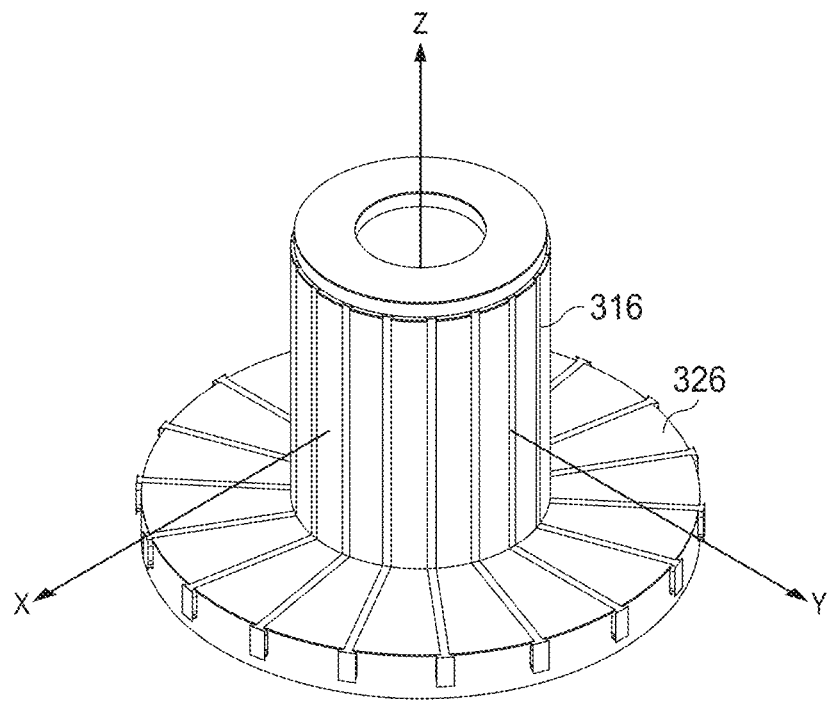
FIG. 2P is an isometric view illustrating the axial core assembly coupled to the inner rotor core assembly of FIG. 2N.

FIG. 2P is an isometric view illustrating the first axial rotor core assembly 326 coupled to the inner rotor core assembly 310 of FIG. 2N. In some embodiments, the plurality of conductive bars 324 radiating towards the center of the IM 300 may align with the plurality of inner rotor conductive bars 314 that are parallel to, and radially spaced from the central longitudinal axis 101 of the inner rotor core assembly 316. In certain embodiments, each of the plurality of conductive bars 324 radiating from the center of the IM 300 may be electrically coupled with one of the plurality of inner rotor conductive bars 314. In one embodiment, each of the plurality of conductive bars 324 radiating from the center of the IM 300 may align with and electrically coupled to one or more of the plurality of outer conductive bars 334 of the outer rotor core assembly 336. In one embodiment, the number of outer conductive bars 334 may be greater than the number of conductive bars 324 radiating from the center of the IM 300. For instance, the number of outer conductive bars 334 may be three times the number of conductive bars 324 radiating from the center of the IM 300.

Figure 2Q:
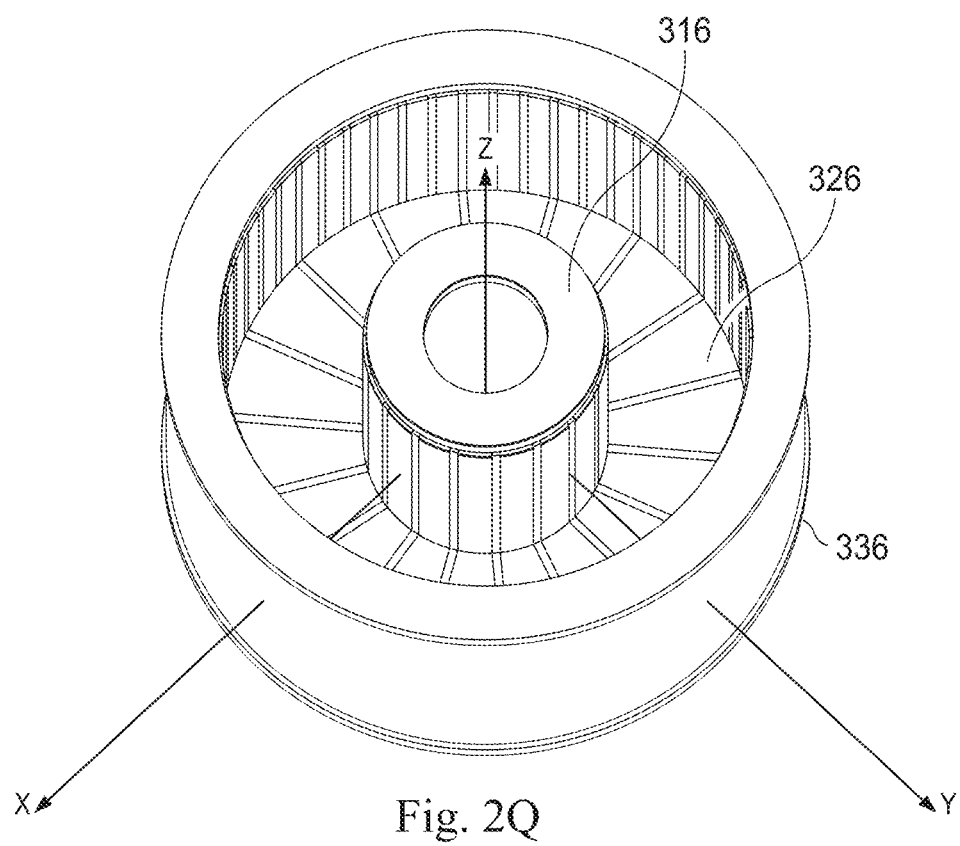
FIG. 2Q is an isometric view illustrating the assembly of FIG. 2N coupled to the outer rotor core assembly of FIG. 2K.

FIG. 2Q is an isometric view illustrating the assembly of FIG. 2P coupled to the outer rotor core assembly 336 of FIG. 2K. That is, FIG. 2Q illustrates one embodiment of a new class of IM 300. Specifically, a Triple Rotor Induction Motor (TRIM). In some embodiments, a triple rotor configuration may achieve a greater maximum phase flux linkage (λmax) for a given volume than a conventional IM. A triple rotor configuration may therefore be a more efficient configuration in terms of torque and motor efficiency compared to a convention IM. Another advantage of having multiple rotors, be it two, three, or four, is that their higher inertia makes them better suited for pulsing loads, such as reciprocal compressors. The effect of having multiple rotors on flux linkage, magnetic saturation, flux density, and torque may be studied using finite element analysis.

Figure 2R:
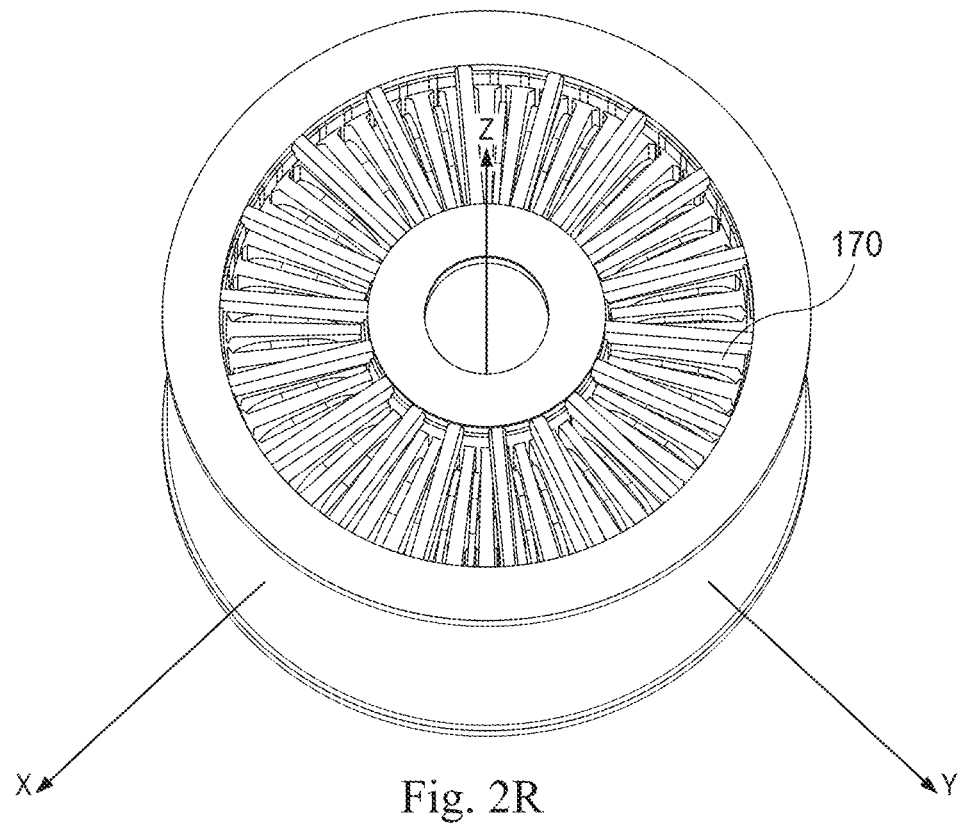
FIG. 2R is an isometric view illustrating a coil winding assembly (stator) within the assembly of FIG. 2Q.

FIG. 2R is an isometric view illustrating a stator within the assembly of FIG. 2Q. In some embodiments, the rotating sinusoidal MMF of the stator may be produced by the coil winding assembly 500 described herein for torque production. In certain embodiments, the coil winding assembly 500 may be connected to a 3-phase supply. In another embodiment, the coil winding assembly 500 may be connected to a single-phase supply. In either case, a sinusoidal distributed radially directed rotating magnetic flux density wave may be set-up in an air gap between the coil winding assembly 500 and the radial rotor core assemblies 316 and 336. The coil winding assembly 500 and the radial rotor core assemblies 316 and 336 may be configured to minimize the air gap(s) between the coil winding assembly 500 and the radial rotor(s) assemblies 316 and 336. In another embodiment, a sinusoidal distributed axially directed rotating magnetic flux density wave may be set-up in an air gap between the coil winding assembly 500 and the axial rotor core assemblies 326 and 346. The coil winding assembly 500 and the axial rotor core assemblies 326 and 346 may be configured to minimize the air gap(s) between the coil winding assembly 500 and the axial rotor(s) assemblies 326 and 346. In both instances, the speed of the rotation of the field will be directly proportional to the frequency of supply, be it a 3-phase or a single-phase supply. In contrast, the speed of the rotation of the field will be inversely proportional to the number of winding poles in the coil winding assembly 500. While the magnitude of the flux wave will be proportional to the magnitude of the voltage of the applied 3-phase or single-phase supply and inversely proportional to frequency of the applied 3-phase or single-phase supply.

Figure 2S:
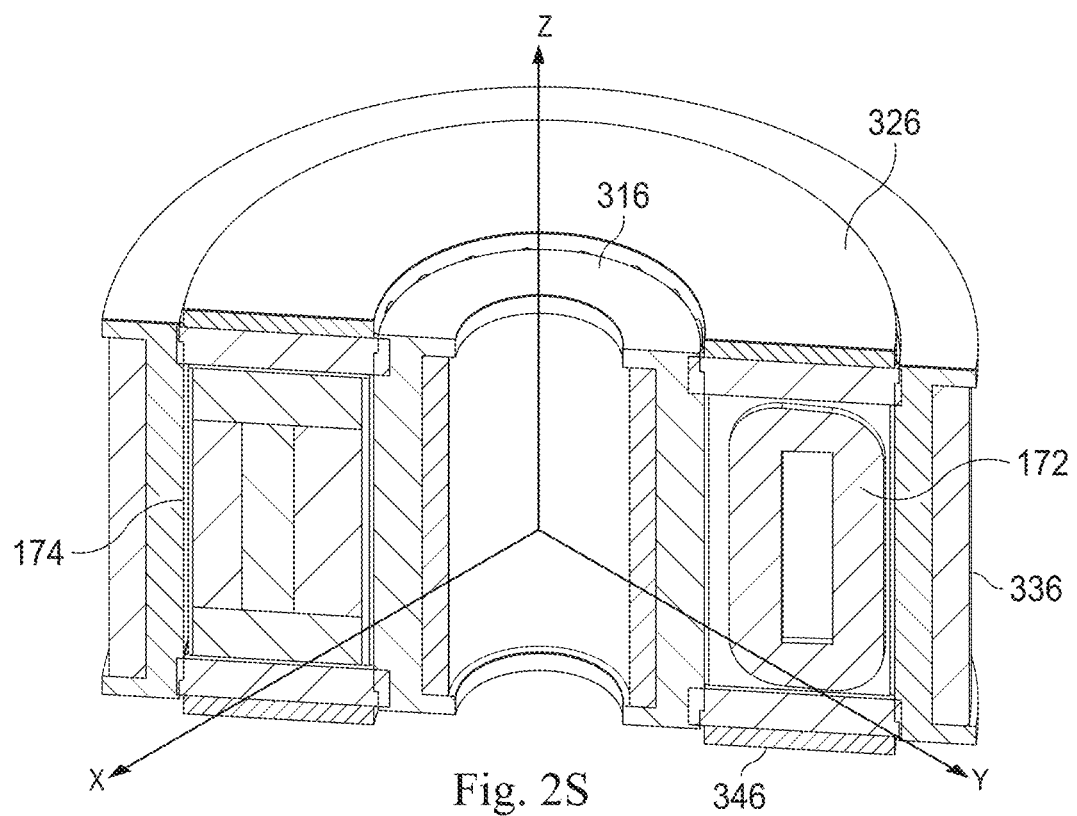
FIG. 2S is an isometric section view illustrating the assembly of FIG. 2R coupled to a second axial core.

FIG. 2S is an isometric section view illustrating the assembly of FIG. 2R coupled to a second axial rotor core assembly 346. Specifically, FIG. 2S is a section view through a coil 526 and a coil spacer 174. In some embodiments, the second axial rotor core assembly 346 may be similar or analogous to the first axial rotor core assembly 326 of FIG. 2N.

Figure 2T:
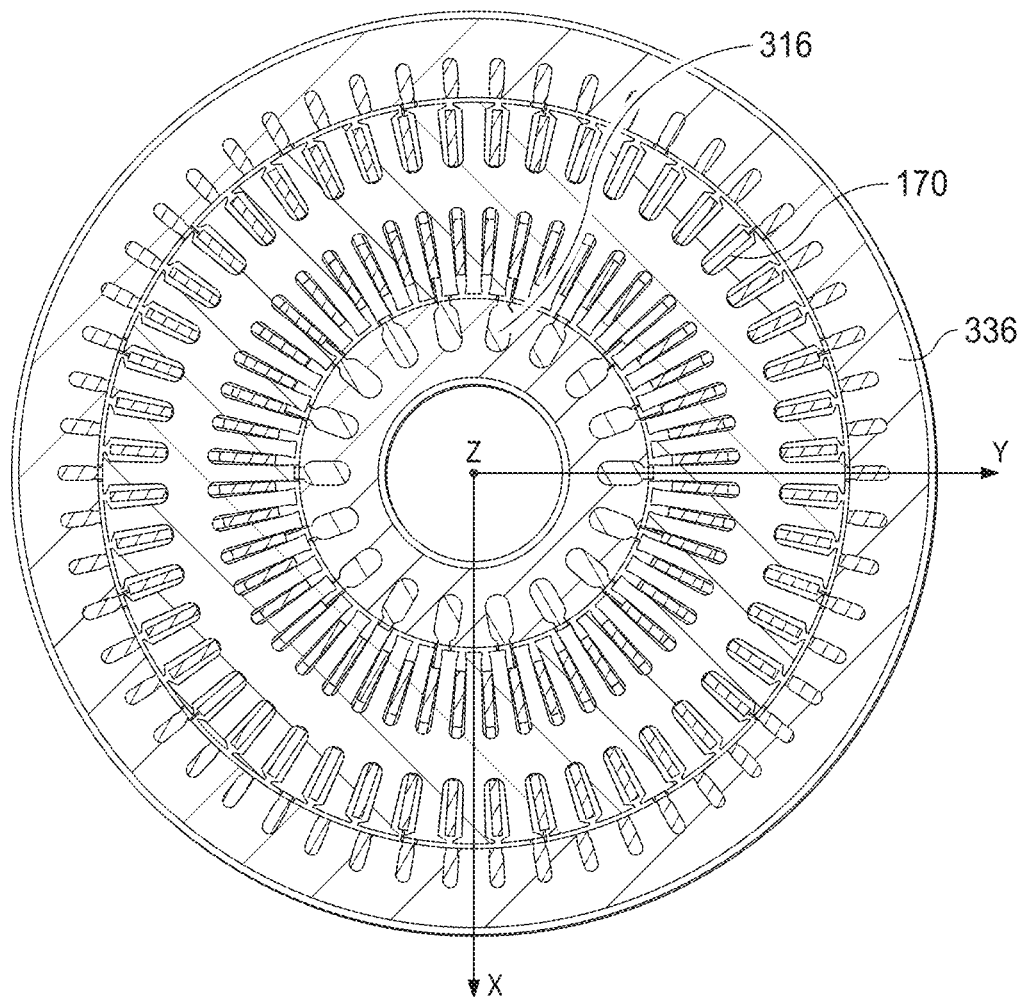
FIG. 2T illustrates a section top view of the coil winding assembly within the complete rotor showing the interplay of the rotor cage, cores, and coil winding assembly.

FIG. 2T illustrates a section top view of the coil winding assembly 500 within the inner rotor core assembly 316 and the outer rotor core assembly 336, showing the interplay of the radial rotor core assemblies 316, 336 and coil winding assembly 500.

Referring once more to the embodiment of FIG. 2A. FIG. 2A is an isometric view of a quadruple rotor motor assembly according to the principles of the present invention having four rotors. That is, FIG. 2A illustrates a new class of IM 300, a Quadruple-Rotor Induction Machine (QRIM), having a single coil winding assembly 500. A quadruple rotor configuration offers advantages over a conventional IM in terms of torque and motor efficiency.

In some embodiments, the first axial rotor core assembly 326 and the coil winding assembly 500 are configured to minimize an airgap between the first axial rotor core assembly 326 and the coil winding assembly 500. In certain embodiments, the axial rotor core assemblies 326 and 346, and the coil winding assembly 500 are configured to minimize the airgaps between the axial rotor core assemblies 326 and 346, and the coil winding assembly 500. In some embodiments, the outer rotor core assembly 336 and the coil winding assembly 500 are configured to minimize an airgap between the outer rotor core assembly 336 and the coil winding assembly 500. In certain embodiments, the outer rotor core assembly 336, the inner rotor core assembly 316, and the coil winding assembly 500 are configured to minimize the airgaps between the outer rotor core assembly 336 and the coil winding assembly 500, and between the inner rotor core assembly 316 and the coil winding assembly 500.

In some embodiments, an Induction Machine (IM) 300 may include a magnetic toroidal cylinder 100 having an inner rotor core 310 coupled to an inner rotor cage 312 to form an inner rotor core assembly 316, a first axial rotor core 320 coupled a first set of axial spokes 324 to form a first axial rotor core assembly 326, and a second axial rotor core 340 coupled to a second set of axial spokes 334 to form a second axial rotor core assembly 346. The inner rotor cage 312 constructed from a plurality of conductive bars 314 radially spaced from the central longitudinal axis 101 of the IM 300 and attached at each end to a first inner shorting ring 318 and a second inner shorting ring 318. The first set of axial spokes 324 constructed from a plurality of conductive bars 324 connected to, and radiating from, the first inner shorting ring 318. The second set of axial spokes 344 constructed from a plurality of conductive bars 344 connected to, and radiating from the second inner shorting ring 318, thereby forming a three sided magnetic torque tunnel comprising at least a first inductive tunnel segment and a second inductive tunnel segment. A coil winding assembly 500 having a plurality of coils 526 is positioned within the magnetic toroidal cylinder 100. The coil winding assembly 500 is configured so that there is at least one coil 526 within each of the inductive tunnel segments.

In certain embodiments, the magnetic toroidal cylinder 100 may further include an outer rotor core 330 coupled to an outer rotor cage 332 to form an outer rotor core assembly 336. The outer rotor cage 332 constructed from a plurality of conductive bars 334 radially spaced from the central longitudinal axis 101 of the IM 300 and attached at each end to a first outer shortening ring 338 and a second outer shorting ring 338. The first set of axial spokes radiating from the first inner shorting ring 318 connecting to the first outer shorting ring 318 and the second set of axial spokes radiating from the second inner shorting ring 318 and connecting to the second outer shorting ring 338, thereby forming a four-sided magnetic torque tunnel having a plurality of inductive tunnel segments. In one embodiment, a radial length of the inner face of the first axial rotor core may be longer than the longitudinal length of an inner face of the inner rotor core 310. There may be an airgap between the outer rotor core assembly 336 and the coil winding assembly 500 and the outer rotor core assembly 336 may be constructed to minimize this airgap in order to improve the performance of the IM 300. There may also be an airgap between the coil winding assembly 500 and the first axial rotor core assembly 326, and the first axial rotor core assembly 326 may be constructed to minimize this air gap as well. The coil winding assembly 500 may be positioned about the central longitudinal axis 101 of the IM 300 within the path of the rotor core assembles 316, 326, 336, and 346 which are adapted to rotate about the central longitudinal axis 101. In one embodiment, the outer rotor core assembly 336 may further define a transverse slot which allows a support for the coil winding assembly 500 to pass through the outer rotor core assembly 336. In certain embodiments, an outer edge of the first axial rotor core assembly 326 and a first end of the outer core assembly 336 define the transverse slot.

In certain embodiments, the number of conductive bars 314 in the inner rotor cage 312 is different from a number of conductive bars 334 in the outer rotor cage 332. For instance, the number of conductive bars 334 in the outer rotor cage 332 may be three times the number of conductive bars 314 in the inner rotor cage 312. In one embodiment, the conductive bars 314 of the inner rotor cage 312 are substantially parallel to the central longitudinal axis of the IM 300, while in another embodiment, they may be skewed with respect to the central longitudinal axis. Further, the number of conductive bars 314 in the inner rotor cage 312 may be greater than the number of slots in the coil winding assembly 500. For instance, the number of conductive bars 314 may be a non-integer multiple of the number of slots in the coil winding assembly 500. The number of conductive bars 314 may be a prime number. The number of conductive bars 314 in the inner rotor cage 312 is the same as a number of conductive bars 324 that comprise the first set of axial spokes, which have the profile of an I-beam when viewed from a direction that is perpendicular to a surface of the first axial rotor core assembly 326. The conductive bars 314 of the inner rotor cage 312 have a profile that is tapered with respect to depth or comprise high impedance conductive bars 314 and low impedance conductive bars 314 in parallel. The conductive bars 314 and the first and second shorting rings 318 may be made of aluminum.

In certain embodiments, the inner rotor core 310 may be formed of laminated strips of grain-oriented electrical steel, which may be coated with an oxide layer, while in other embodiments the inner rotor core 310 may be formed of an isotropic ferromagnetic material which may be a soft magnetic composite material. The isotropic material may also be a ferromagnetic open cell metal foam material infused with a structural support matrix made of thermoset or a thermoplastic resin having a porosity between about 75% and about 95% by volume.

In some embodiments, an Induction Machine (IM) 300 may include a magnetic toroidal cylinder 100 having an inner rotor core 310 coupled to an inner rotor cage 312 to form an inner rotor core assembly 316, a first axial rotor core coupled to a first set of axial spokes to form a first axial rotor core assembly 326, and an outer rotor core 330 coupled to an outer rotor cage 332 to form an outer rotor core assembly 336. The inner rotor cage 312 constructed from a plurality of conductive bars 314 radially spaced from the central longitudinal axis of the IM 300 and attached at each end to a first inner shorting ring 318 and a second inner shorting ring 318. The outer rotor cage 332 constructed from a plurality of conductive bars 314 radially spaced from the central longitudinal axis of the IM 300 and attached at each end to a first outer shortening ring 338 and a second outer shorting ring 338. The first set of axial spokes 324 constructed from a plurality of conductive bars 324 connected to, and radiating from, the first inner shorting ring 318 and connecting to the first outer shortening ring 338 thereby forming a three-sided magnetic torque tunnel comprising at least a first inductive tunnel segment and a second inductive tunnel segment. A coil winding assembly 500 having a plurality of coils is positioned within the magnetic toroidal cylinder 100. The coil winding assembly 500 is configured so that there is at least one coil within each of the inductive tunnel segments. In certain embodiments, a longitudinal length of an inner face of the inner rotor core assembly 316 may be longer than a radial length of the inner face of the first axial rotor core assembly 326.

In certain embodiments, the magnetic toroidal cylinder 100 of the IM 300 may further include a second axial rotor core 322 coupled to a first set of axial spokes 324 to form a second axial rotor core assembly 326. The second set of axial spokes 324 constructed from a plurality of conductive bars 324 connected to, and radiating from, the second inner shorting ring 318 and connecting to the second outer shortening ring 338 thereby forming a four-sided magnetic torque tunnel having a plurality of inductive tunnel segments. In one embodiment the longitudinal length of an inner face of the inner rotor core 310 is longer than a radial length of an inner face of the first axial rotor core 320.

In some embodiments, an Induction Machine (IM) 300 may include a magnetic toroidal cylinder 100 having an inner rotor core 310 coupled to an inner cage 312 to form an inner rotor core assembly 316, a first axial rotor core 320 coupled a first set of axial spokes 324 to form a first axial rotor core assembly 326, an outer rotor core 330 coupled to an outer cage 332 to form an outer rotor core assembly 336, and a second axial rotor core 340 coupled to a second set of axial spokes 344 to form a second axial rotor core assembly 336. The inner rotor cage 312 constructed from a plurality of conductive bars 314 radially spaced from the central longitudinal axis 101 of the IM 300 and attached at each end to a first inner shorting ring 318 and a second inner shorting ring 318. The outer rotor cage 332 constructed from a plurality of conductive bars 334 radially spaced from the central longitudinal axis of the IM 300 and attached at each end to a first outer shortening ring 338 and a second outer shorting ring 338. The first set of axial spokes 324 constructed from a plurality of conductive bars 324 connected to, and radiating from, the first inner shorting ring 318 and connecting to the first outer shortening ring 338. The second set of axial spokes 334 constructed from a plurality of conductive bars 334 connected to, and radiating from, the second inner shorting ring 318 and connecting to the second outer shortening ring 338, thereby forming a magnetic torque tunnel. The outer rotor core assembly 336 may further define a transverse slot which allows a support for a stator placed within the magnetic torque tunnel to pass through the outer rotor core assembly 336. In certain embodiments, an outer edge of the first axial rotor core assembly 326 and a first end of the outer core assembly 336 define the transverse slot.

In some embodiments, the first axial rotor core assembly 326 and the coil winding assembly 500 are configured to minimize an airgap between the first axial rotor core assembly 326 the coil winding assembly 500. In certain embodiments, the axial rotor core assemblies 326 and 346, and the coil winding assembly 500 are configured to minimize the airgaps between the axial rotor core assemblies 326 and 346, and the coil winding assembly 500. In some embodiments, the outer rotor core assembly 336 and the coil winding assembly 500 are configured to minimize an airgap between the outer rotor core assembly 336 and the coil winding assembly 500. In certain embodiments, the outer rotor core assembly 336, the inner rotor core assembly 316, and the coil winding assembly 500 are configured to minimize the airgaps between the outer rotor core assembly 336 and the coil winding assembly 500 and between the inner rotor core assembly 316 and the coil winding assembly 500.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

What is claimed is:

1. An induction machine comprising:
   a toroidal cylinder comprising;
   an inner rotor core coupled to an inner cage, the inner cage comprising a first set of conductive bars radially spaced about a central longitudinal axis of the induction machine to form an inner rotor core assembly, and the first set of conductive bars are coupled to a first inner shorting ring and a second inner shorting ring;
   a first axial rotor core coupled to a first set of axial spokes to form a first axial rotor core assembly, the first set of axial spokes comprising a second set of conductive bars coupled to, and radiating from, the first inner shorting ring;
   a second axial rotor core coupled to a second set of axial spokes to form a second axial rotor core assembly, the second set of axial spokes comprising a third set of conductive bars coupled to, and radiating from, the second inner shorting ring, and the rotor core assemblies forming a three sided magnetic torque tunnel comprising a first inductive tunnel segment and a second inductive tunnel segment; and
   a coil winding assembly arranged within the toroidal cylinder, the coil winding assembly comprising a set of coils, and the first inductive tunnel segment surrounding the set of coils.

2. The induction machine of claim 1:
   wherein the toroidal cylinder further comprises an outer rotor core coupled to an outer rotor cage to form an outer rotor assembly, the outer rotor cage comprising a fourth set of conductive bars radially spaced from the central longitudinal axis of the induction machine;
   wherein the fourth set of conductive bars are coupled to a first outer shorting ring and a second outer shorting ring; and
   wherein the first set of axial spokes are coupled to the first outer shorting ring and the second set of axial spokes are coupled to the second outer shorting ring, the rotor core assemblies forming a four sided magnetic torque tunnel comprising the first inductive tunnel segment and the second inductive tunnel segment.

3. The induction machine of claim 2, wherein a quantity of conductive bars, in the first set of conductive bars, in the inner cage is different from a quantity of conductive bars, in the fourth set of conductive bars, in the outer rotor cage.

4. The induction machine of claim 2, wherein the outer rotor assembly and the coil winding assembly are configured to minimize an air gap between the outer rotor assembly and the coil winding assembly.

5. The induction machine of claim 2, wherein the outer rotor assembly defines, at least in part, a transverse slot, the transverse slot configured to support the coil winding assembly to pass through the outer rotor assembly.

6. The induction machine of claim 2, wherein an outer edge of the first axial rotor assembly and a first end of the outer rotor core assembly cooperate to define a transverse slot.

7. The induction machine of claim 2, wherein a longitudinal length of an inner face of the inner rotor core assembly is longer than a radial length of an inner face of the first axial rotor core assembly.

8. The induction machine of claim 1, wherein a radial length of an inner face of the first axial rotor core assembly is longer than a longitudinal length of an inner face of the inner rotor core assembly.

9. The induction machine of claim 1, wherein the rotor core comprises laminated strips of grain-oriented electrical steel coated with an oxide layer.

10. The induction machine of claim 1, wherein the rotor core comprises an isotropic ferromagnetic material.

11. The induction machine of claim 1, wherein the rotor core comprises an isotropic ferromagnetic material, the isotropic ferromagnetic material formed of a ferromagnetic open cell metal foam material comprising a porosity between 75% and about 95% by volume, and infused with a structural support matrix made of thermoset or a thermoplastic resin.

12. The induction machine of claim 1, wherein the first set of conductive bars, the second set of conductive bars, and the third set of conductive bars defines a profile tapered with respect to depth.

13. A method of producing electric power with an induction machine comprising:
    positioning a toroidal cylinder about a central longitudinal axis of the induction machine, the toroidal cylinder defined by:
    an inner rotor core coupled to an inner cage, the inner cage comprising a first set of conductive bars radially spaced about the central longitudinal axis of the induction machine to form an inner rotor core assembly, the first set of conductive bars are coupled to a first inner shorting ring and a second inner shorting ring;
    a first axial rotor core coupled to a first set of axial spokes to form a first axial rotor core assembly, the first set of axial spokes comprising a second set of conductive bars coupled to, and radiating from, the first inner shorting ring;
    a second axial rotor core couple to a second set of axial spokes to form a second axial rotor core assembly, the second set of axial spokes comprising a third set of conductive bars coupled to, and radiating from, the second inner shorting ring, the rotor core assemblies forming a three sided magnetic torque tunnel comprising a first inductive tunnel segment and a second inductive tunnel segment, and the rotor core assemblies configured to rotate about the central longitudinal axis;
    positioning a coil winding assembly within the toroidal cylinder about the central longitudinal axis within a rotational path of the rotor core assemblies, the coil winding assembly comprising a set of coils, the first inductive tunnel segment surrounding of the plurality of coils; and
    applying current to the setof coils in a sequence that continuously impacts torque to turn the rotor core assemblies in a target direction, relative to the coil winding assembly.

14. The method of claim 13:
    wherein the toroidal cylinder further comprises an outer rotor core coupled to an outer rotor cage to form an outer rotor assembly, the outer rotor cage comprising a fourth set of conductive bars radially spaced about the central longitudinal axis of the induction machine;

wherein the fourth plurality of conductive bars are coupled to a first outer shorting ring and a second outer shorting ring; and wherein the first set of axial spokes are coupled to the first outer shorting ring and the second set of axial spokes are coupled to the second outer shorting ring, the rotor core assemblies forming a four sided magnetic torque tunnel comprising the first inductive tunnel segment and the second inductive tunnel segment.

15. The method of claim 14, wherein the outer rotor assembly and the coil winding assembly are configured to minimize an air gap between the outer rotor assembly and the coil winding assembly.

16. The method of claim 14, wherein a longitudinal length of an inner face of the inner rotor core assembly is longer than a radial length of an inner face of the first axial rotor core assembly.

17. The method of claim 14, wherein the outer rotor core assembly and the coil winding assembly are configured to minimize an air gap between the outer rotor core assembly and the coil winding assembly.

18. The method of claim 13, wherein the sequence that continuously impacts torque is synchronized to the rotation of the rotor core assembles.

19. The method of claim 13, wherein a radial length of an inner face of the first axial rotor core assembly is longer than a longitudinal length of an inner face of the inner rotor core assembly.

20. The method of claim 13, wherein the first axial rotor core assembly and the coil winding assembly are configured to minimize an airgap between the first axial rotor core assembly and the coil winding assembly.

* * * * *